US008080313B2

(12) United States Patent
Bonneau et al.

(10) Patent No.: US 8,080,313 B2
(45) Date of Patent: Dec. 20, 2011

(54) PARTICLE-TOUGHENED FIBER-REINFORCED POLYMER COMPOSITES

(75) Inventors: Mark Richard Bonneau, Brea, CA (US); Jack Douglas Boyd, Silverado, CA (US); Gordon T. Emmerson, Los Alamitos, CA (US); Scott D. Lucas, Anaheim Hills, CA (US); Stephen J. Howard, Chino, CA (US); Spencer Donald Jacobs, Corona, CA (US)

(73) Assignee: Cytec Technology Corp., Wilmington, DE (US)

( * ) Notice: Subject to any disclaimer, the term of this patent is extended or adjusted under 35 U.S.C. 154(b) by 0 days.

(21) Appl. No.: 12/787,180

(22) Filed: May 25, 2010

(65) Prior Publication Data

US 2010/0304119 A1 Dec. 2, 2010

Related U.S. Application Data

(60) Provisional application No. 61/182,002, filed on May 28, 2009.

(51) Int. Cl.
B32B 27/04 (2006.01)
(52) U.S. Cl. .................................. 428/297.4; 428/292.1
(58) Field of Classification Search ............... 428/292.1, 428/297.4
See application file for complete search history.

(56) References Cited

U.S. PATENT DOCUMENTS

| 4,644,039 | A | | 2/1987 | Boyd et al. | |
|---|---|---|---|---|---|
| 5,003,018 | A | | 3/1991 | Repecka | |
| 5,120,823 | A | * | 6/1992 | Boyd | 528/310 |
| 5,189,116 | A | * | 2/1993 | Boyd et al. | 525/423 |
| 5,932,635 | A | * | 8/1999 | Lee et al. | 523/400 |
| 5,955,566 | A | | 9/1999 | Lee et al. | |
| 2003/0158337 | A1 | * | 8/2003 | Choate et al. | 525/107 |
| 2010/0247882 | A1 | * | 9/2010 | Hill et al. | 428/212 |
| 2010/0304119 | A1 | * | 12/2010 | Bonneau et al. | 428/297.4 |
| 2010/0305274 | A1 | * | 12/2010 | Bonneau et al. | 525/107 |

FOREIGN PATENT DOCUMENTS

| EP | 0816438 A2 | * | 7/1998 |
|---|---|---|---|
| JP | 2006-219513 A | | 4/2006 |
| WO | WO2009118509 | * | 10/2009 |
| WO | WO2010138546 | * | 12/2010 |
| WO | WO2010138556 | * | 12/2010 |

OTHER PUBLICATIONS

ISR/Written Opinion for PCT/US2010/036142 mailed Aug. 9, 2010.

* cited by examiner

*Primary Examiner* — Newton Edwards
(74) *Attorney, Agent, or Firm* — Robert R. Neller; Thi D. Dang

(57) ABSTRACT

Particle toughened, fiber-reinforced composites include a fiber region and an interlayer region between the fibers. The fiber region includes a plurality of fibers at least partially within a first polymer composition including a first base polymer formulation and a first plurality of toughening particles. The interlayer region includes a second polymer composition including a second base polymer formulation and at least one of the first plurality of toughening particles and a second plurality of toughening particles. Examples of first and second pluralities of toughening particles, respectively, may include core shell rubbers and polyimides. Increasing concentration of the first plurality of toughening particles may improve the composite toughness while preserving thermal properties of the composite, such as weight loss after extended duration exposure to elevated temperature. It is further discovered that the relative placement of the toughening particles influences composite mechanical properties, such as compression after impact (CAI) strength.

13 Claims, 18 Drawing Sheets

PARTICLE-TOUGHENED FIBER-REINFORCED POLYMER COMPOSITES

CROSS-REFERENCE TO RELATED APPLICATION

This application claims priority to U.S. Provisional Application No. 61/182,002, filed May 28, 2009, which is incorporated herein by reference in its entirety.

BACKGROUND

1. Field

Embodiments of the present disclosure pertain to polymer compositions suitable for high temperature service and, in particular, to particle toughened polymer compositions comprising a plurality of toughening particles and prepregs and composites formed therefrom.

2. Description of the Related Art

Laminated polymer matrix composite structures (PMCs) are widely used in a number of applications. For example, composite structures are being increasingly used in high performance aerospace applications. PMCs combine selectively oriented fibers that are enveloped in a surrounding polymeric matrix material. These composite structures exhibit good mechanical properties for their weight (e.g., strength, stiffness, toughness), as well as a wide service temperature window and ease of manufacture, making them well suited for aerospace applications.

Most polymer composites employ epoxy resins, owing to the good combination of mechanical properties wide temperature range, and ease of part manufacture afforded by epoxies.

However, some composite applications require high thermal durability in the finished composite and PMC parts used in extreme environments, such as high temperature applications, can lack adequate thermal durability. For example, epoxies may exhibit significant weight loss after long durations at high temperatures. Currently, there are no cost-effective polymer matrix composites that can withstand these extreme environments.

Polymers such as bismaleimides (BMIs) are gaining acceptance in aerospace applications that require service temperatures beyond the capability of epoxy resins. BMIs possess higher glass transition temperatures, $T_g$, than epoxies and exhibit relatively low weight loss during thermal ageing. BMIs also exhibit epoxy-like processing properties and high temperature durability. As a result, BMI resin-based composites possess good mechanical properties at temperatures within the range of about 149 to 232° C.

However, while the glass transition temperatures of BMIs are higher than those of epoxies, BMIs are also relatively rigid. As a result, BMI composites tend to exhibit poor damage tolerance and poor temperature cycling resistance to micro-cracking.

Furthermore, attempts to toughen BMIs through additives have proven relatively unsuccessful. For example, toughening agents typically employed in epoxy compositions, such as carboxyl-terminated butadiene acrylonitrile (CTBN), butadiene, and styrene type rubbers, have been observed to either reduce the $T_g$ or promote high weight loss during thermal ageing. Thermal exposure may also reduce the effectiveness of these types of rubbers.

From the forgoing, then, there exists an ongoing need for tough composites capable of operating at high temperatures for extended duration.

SUMMARY

Embodiments of the disclosure provide particle-toughened polymer compositions and prepregs suitable for elevated temperature service. In an embodiment, the polymer compositions comprise a polymer material and first and second toughening particles. In certain embodiments, the polymer material comprises a bismaleimide.

The prepregs may comprise first and second regions. In certain embodiments, a first region may comprise a plurality of fibers, a first polymer composition including a first polymer material and a first plurality of particles, while the second region comprises a second polymer composition including a second polymer material and a second plurality of particles. In further embodiments, the first plurality of particles may also be present in the second polymer composition, provided that the first plurality of particles do not substantially interfere with one or more interactions between the second polymer material and the second plurality of particles. In further embodiments, the prepregs may be employed to form composite materials.

In an embodiment, a particulate-toughened polymer composition is provided. The composition comprises a base polymer formulation, a first plurality of particles comprising core shell rubbers and a second plurality of particles.

In another embodiment, a method of making a particulate-toughened composition is provided. The method comprises providing a base polymer formulation, adding a first plurality of particles to the base polymer formulation, the first plurality of particles comprising core shell rubbers, and adding a second plurality of particles to the base polymer formulation.

In another embodiment, a prepreg is provided. The prepreg comprises a first region and a second region. The first region comprises a plurality of fibers and a first polymer composition. The first polymer composition comprises a first polymer material surrounding at least a portion of the fibers and a first plurality of particles positioned within the first polymer material. The second region comprises a second polymer composition. The second polymer composition comprises a second polymer material and a second plurality particles positioned within the second polymer material. The first plurality of particles are not substantially positioned within the second region.

In a further embodiment, a prepreg is provided. The prepreg comprises a first region and a second region. The first region comprises a plurality of fibers and a first polymer composition. The first polymer composition comprises a first polymer material surrounding at least a portion of the fibers and a first plurality of particles positioned within the first polymer composition. The second polymer composition comprises a second polymer material, the first plurality of particles positioned within the second polymer material, and a second plurality of particles positioned within the second polymer material. The first plurality of particles do not substantially interfere with an interaction occurring between the second plurality of particles and the second polymer material.

In an additional embodiment, a method of making a prepreg is provided. The method comprises forming a first region and forming a second region of the prepreg. The first region comprises a plurality of fibers and a first polymer composition. The first polymer composition comprises a first polymer material surrounding at least a portion of the fibers and a first plurality of particles positioned within the first polymer material. The second region of the composite comprises a second polymer composition, comprising a second polymer material and at least one of the first plurality of particles and a second plurality of particles within the second polymer material.

DETAILED DESCRIPTION

Figure 1:
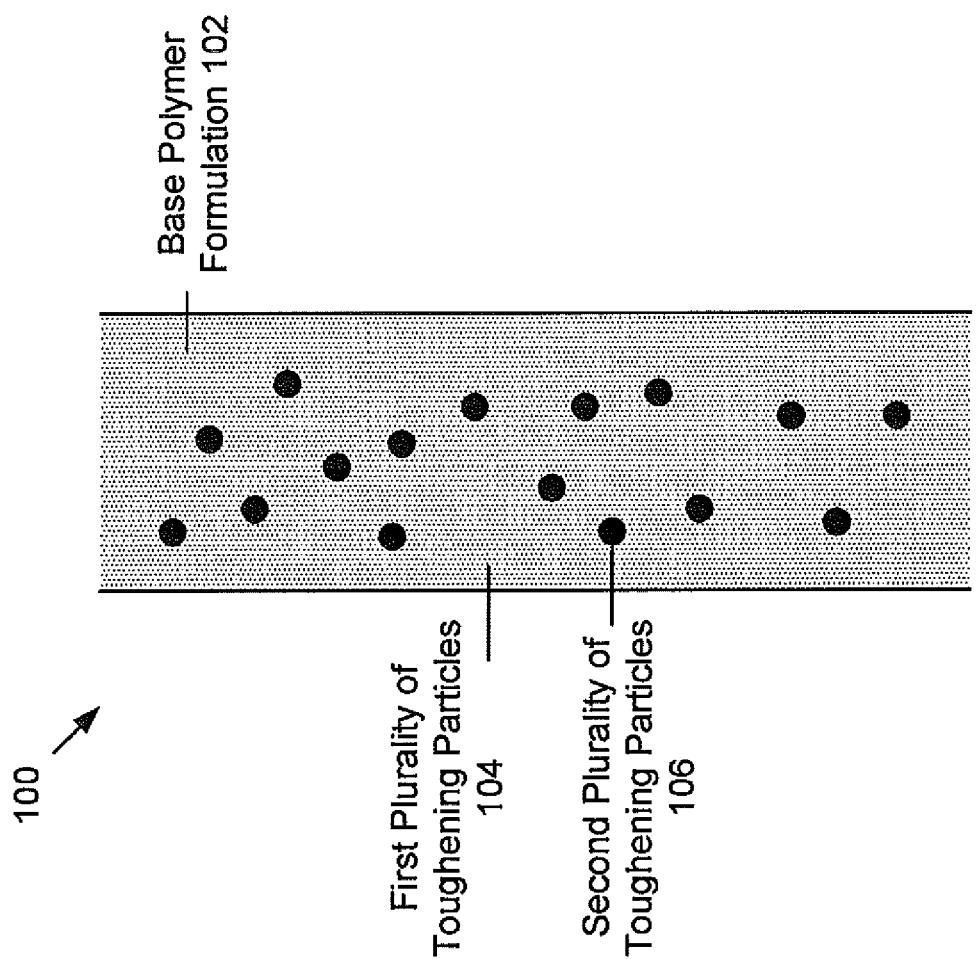
FIG. 1 is a schematic illustration of an embodiment of a particle-toughened composition suitable for high temperature service.

The terms "approximately", "about", and "substantially" as used herein represent an amount close to the stated amount that still performs a desired function or achieves a desired result. For example, the terms "approximately", "about", and "substantially" may refer to an amount that is within less than 10% of, within less than 5% of, within less than 1% of, within less than 0.1% of, and within less than 0.01% of the stated amount.

The term "room temperature" as used herein has its ordinary meaning as known to those skilled in the art and may include temperatures within the range of about 16° C. (60° F.) to 32° C. (90° F.).

The term "fiber" as used herein has its ordinary meaning as known to those skilled in the art and may include one or more fibrous materials adapted for the reinforcement of composites. Fibers may take the form of whiskers, short fibers, continuous fibers, filaments, tows, bundles, sheets, plies, and combinations thereof. Continuous fibers may further adopt any of unidirectional, multi-dimensional (e.g., two- or three-dimensional), non-woven, woven, knitted, stitched, wound, and braided configurations, as well as swirl mat, felt mat, and chopped mat structures. Woven fiber structures may comprise a plurality of woven tows having less than about 1000 filaments, less than about 3000 filaments, less than about 6000 filaments, less than about 12000 filaments, less than about 24000 filaments, less than about 48000 filaments, less than about 56000 filaments, and less than about 125000 filaments. In further embodiments, the tows may be held in position by cross-tow stitches, weft-insertion knitting stitches, or a small amount of resin, such as a thermoplastic resin.

The composition of the fibers may be varied, as necessary. Embodiments of the fiber composition may include, but are not limited to, glass, carbon, aramid, quartz, polyethylene, polyester, poly-p-phenylene-benzobisoxazole (PBO), boron, polyamide, graphite, silicon carbide, silicon nitride, Astroquartz®, Tyranno®, Nextel®, Nicalon®, and combinations thereof.

The terms "cure" and "curing" as used herein have their ordinary meaning as known to those skilled in the art and may include polymerizing and/or cross-linking processes. Curing may be performed by processes that include, but are not limited to, heating, exposure to ultraviolet light, and exposure to radiation. In certain embodiments, curing may take place within a polymer matrix or resin. Prior to curing, the matrix or resin may further comprise one or more compounds that are, at about room temperature, liquid, semi-solid, crystalline solids, and combinations thereof. In further embodiments, the matrix or resin may be partially cured in order to exhibit a selected stickiness or tack. In certain embodiments, consolidation and curing may be performed in a single process.

The term "consolidation" as used herein has its ordinary meaning as known to those skilled in the art and may include processes in which the resin or matrix material flows so as to displace void space within and adjacent fibers. For example, "consolidation" may include, but is not limited to, flow of matrix into void spaces between and within fibers and prepregs, and the like. "Consolidation" may further take place under the action of one or more of heat, vacuum, and applied pressure.

The term "impregnate" as used herein has its ordinary meaning as known to those skilled in the art and may include the introduction of a matrix or resin material between or adjacent to one or more fibers. The matrix or resin may take the form of films, powders, liquids, and combinations thereof. Impregnation may be facilitated by the application of one or more of heat, pressure, and solvents.

The term "prepreg" as used herein has its ordinary meaning as known to those skilled in the art and may include sheets or lamina of fibers that have been impregnated with a matrix or resin material. The matrix or resin may also be present in a partially cured state.

The terms "layup" and "prepreg layup" as used herein have their ordinary meaning as known to those skilled in the art and may include one or more prepreg layers that are placed adjacent one another. In certain embodiments, the prepreg layers within the layup may be positioned in a selected orientation with respect to one another. For example, prepreg layups may comprise prepreg layers having unidirectional fiber architectures, with the fibers oriented at 0°, 90°, a selected angle θ, and combinations thereof, with respect to the largest dimension of the layup, such as the length. It may be further understood that, in certain embodiments, prepregs having any combination of fiber architectures, such as unidirectional and multi-dimensional, may be combined to form the prepreg layup.

In further embodiments, prepreg layers may optionally be stitched together with a threading material in order to inhibit their relative motion from a selected orientation. Layups may be manufactured by techniques that may include, but are not limited to, hand layup, automated tape layup (ATL), advanced fiber placement (AFP), and filament winding.

Embodiments of the disclosure discuss particle-toughened polymer compositions and fiber-reinforced, particle-toughened composites formed therefrom that are suitable for high-temperature service. In particular embodiments, the polymer compositions and composites may comprise bismaleimides.

In certain embodiments, the toughened polymer compositions may comprise a base polymer formulation and at least two pluralities of toughening particles. For example, the compositions may comprise a first plurality of toughening particles and a secondary plurality of toughening particles, alternatively referred to as primary and secondary toughening particles. The toughening particles may possess thermal and elastic properties which provide improvements in one or more mechanical properties of the polymer compositions. Examples of such mechanical properties may include, but are not limited to, mode I critical strain energy release rate or $G_{ic}$ (toughness). Furthermore, the thermal properties of the polymer composition, such as glass transition temperature, may be substantially unaffected by the presence of the toughening particles.

In further embodiments, composites may also be formed from embodiments of the polymer compositions. The composites may comprise a fiber region and an interlayer region which lies between the fiber containing regions. In one configuration, the fiber region may comprise the base polymer formulation and the second plurality of toughening particles, while the interlayer may comprise the base polymer formulation and first and second plurality of toughening particles. In another configuration, the fiber region may comprise the base polymer formulation and the first plurality of toughening particles, while the interlayer may comprise the base polymer formulation and first and second plurality of toughening particles.

As discussed below, it is found that the relative placement of the first and second plurality of toughening particles within the composites may have a significant influence on the mechanical properties of the composites. For example, in certain embodiments, placing the first plurality of toughening particles in the fiber region and the second plurality of toughening particles in the interlayer region may improve the toughness of the composite while maintaining the CAI strength. These and other advantages of the present disclosure are discussed in detail below.

Figure 2:
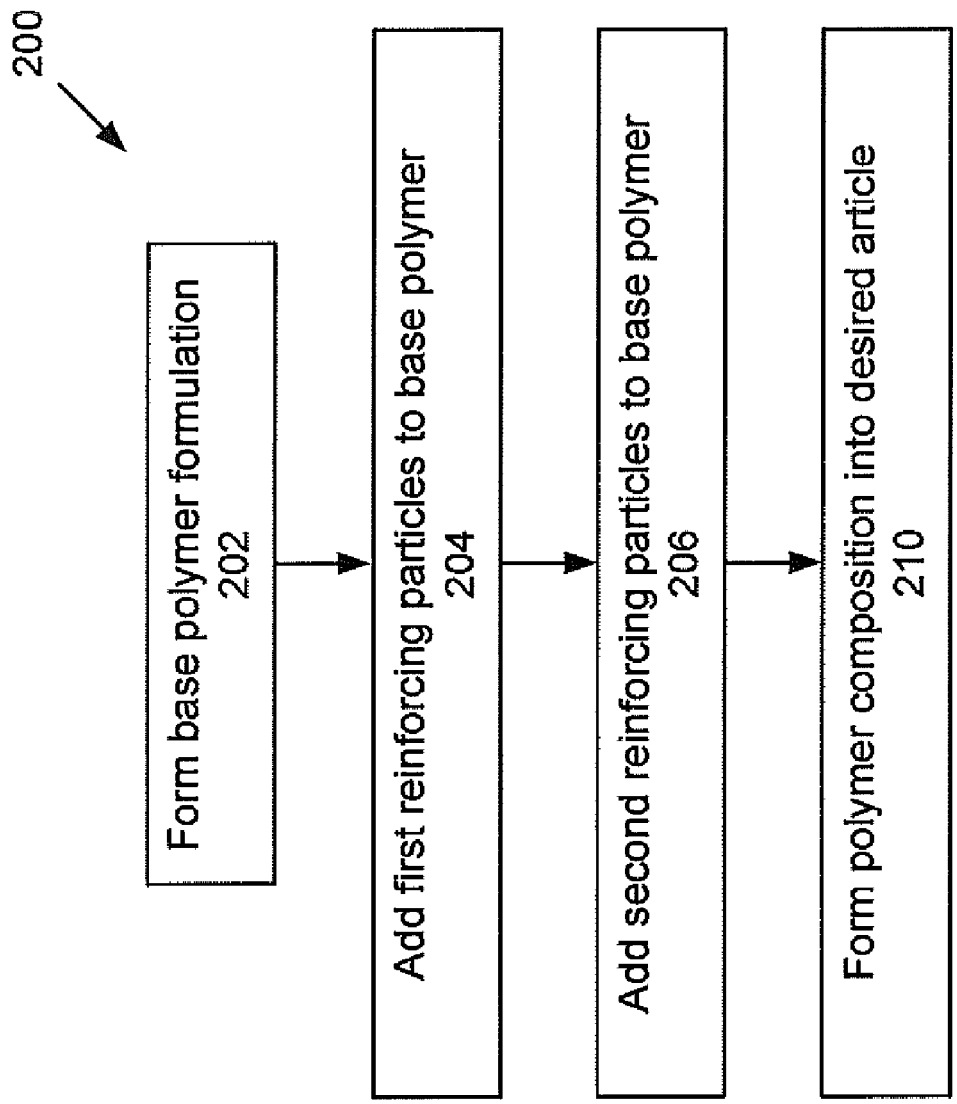
FIG. 2 is an embodiment of a method of making the polymer composition of FIG. 1.

FIG. 1 illustrates one embodiment of a toughened polymer composition 100 comprising a base polymer formulation 102, a first plurality of toughening particles 104 and a second plurality of toughening particles 106. FIG. 2 illustrates one embodiment of a method 200 for forming the composition 100. It may be understood that the operations of the method 200 may be performed in a different order than illustrated in FIG. 2 and fewer or greater operations may be performed without limit.

In block 202 of the method 200, the base polymer formulation 102 is formed. In an embodiment, the base polymer formulation 102 may comprise one or more polymer resins. Examples of polymer resins may include, but are not limited to, bismaleimides, polyimides, benzoxazines, and cyanate esters. The total amount of all polymer resins may be provided in a concentration ranging between about 35-41 wt. % on the basis of the total weight of the polymer composition 100.

In an embodiment, the base polymer formulation 102 may comprise one or more bismaleimide resins as polymer resins. Examples of suitable bismaleimides are disclosed in U.S. Pat. Nos. 4,644,039 and 5,003,018, the entirety of which are hereby incorporated by reference. Further embodiments of suitable bismaleimides for use as polymer resins may include, but are not limited to, toluene diamine bismaleimide (TDA-BMI) and 4,4 bismaleimidodiphenylmethane (e.g., Matrimid 5292A, Huntsman Corp.).

In one embodiment, polymer resins employed in the base polymer formulation 102 may further include nadicimides, which are closely related to bismaleimides. For example, the base polymer formulation 102 may comprise bismaleimides and nadicimides of toluenediamine, aliphatic amines, methylenedianiline, aliphatic diamines, isophorone diamine, and the like.

In additional embodiments, the base polymer formulation 102 may further comprise aliphatic BMIs of di- and polyamines. Examples of aliphatic BMI may include, but are not limited to, those derived from trimethylhexanediamine (TMH-BMI), hexanediamine (hexamethylene diamine bismaleimide or HMDA-BMI), octanediamine, decanediamine, 1,4-diaminocyclohexane, and isophorone diamine. The aliphatic BMIs may be present in a concentration ranging between about 5 to 10 wt. % on the basis of the total weight of the polymer composition 100.

Embodiments of the base polymer formulation 102 may further comprise one or more co-reactants of the base polymer resins. In certain embodiments, co-reactants may comprise the o,o'-diallybisphenols and the o,o'-dipropenylbisphenols, or allylphenoxy, propenylphenoxy, allylphenyl and propenyphenyl-terminated oligomeric compounds. Examples include o,o'-diallylbisphenol A (e.g., Matrimid 5292B, Huntsman Corp), o,o'-diisopropenylbisphenol A, allyleugenol, alkenylphenoxybenzophones and the like. The co-reactants compounds may be present in a concentration ranging between about 24 to 30 wt. % on the basis of the total weight of the polymer composition 100.

Embodiments of the formulation 102 may also comprise one or more low viscosity epoxy resins in minor amounts. Examples of such epoxy resins may include, but are not limited to, bisphenol A-based epoxies, bisphenol-based F epoxies or resorcinol-based epoxies. Other examples may include liquid epoxy resins listed in *Handbook of Epoxy Resins* by Lee and Neville, McGraw-Hill, and *Epoxy Resins, Chemistry and Technology*, May, Ed., Marcel Dekker, 1973, the entirety of which is hereby incorporated by reference. The epoxy resins may be present in a concentration ranging between about 2 to 10 wt. % on the basis of the total weight of the BMI formulation. In further embodiments, the epoxy resins may be present in a concentration ranging between about 3 to 7 wt. % on the basis of the total weight of the polymer composition 100.

Embodiments of the formulation 102 may also comprise one or more inhibitor compounds which reduce the reactivity of the formulation components. Appropriate inhibitors are known in the art and the present invention may further incorporate the use of inhibitors as more fully described in U.S. Pat. No. 5,955,566, the entirety of which are hereby incorporated by reference. Specific examples may include, but are not limited to, hydroquinones such as 1,4-napthoquinone hydrate. The inhibitor compounds may be present in a concentration ranging between about 0.5 to 1 wt. % on the basis of the total weight of the polymer composition 100.

Embodiments of the formulation 102 may additionally comprise one or more flow control agents for adjustment of the viscosity of the composition. The flow control agents may comprise thermoplastics. Examples of such thermoplastics may include, but are not limited to, polyimides. The flow modifiers may be present in a concentration ranging between about 0.5 to 3 wt. % on the basis of the total weight of the polymer composition 100.

In addition to the components discussed above, the composition 100 may further comprise other nonreactive system auxiliary components, including, but not limited to, plasticizers, fillers, pigments, other thermoplastic tougheners, other rheology control agents, tackifiers, and the like.

In blocks 204 and 206 of the method 200, the first and second plurality of toughening particles 104, 106 are added to the polymer composition 100. In one embodiment, the selected toughening particles 104, 106 may possess glass transition temperatures greater than or equal to a selected value. In this manner, the plurality of toughening particles 104, 106 may withstand use at elevated temperatures without substantial degradation. In one embodiment, the glass transition temperature of each of the toughening particles 104, 106 may be greater than or equal to about 200° C. In another embodiment, the glass transition temperature of the toughening particles 104, 106 may be greater than or equal to about 300° C.

In further embodiments, the first and second plurality of toughening particles 104, 106 may be selected with elastic properties within a range that toughens the composition 100.

In an embodiment, the elastic modulus of the first and second plurality of toughening particles 104, 106 may be approximately less than that of the base polymer formulation 102 after curing. In other embodiments, the elastic modulus of the first and second plurality of toughening particles is less than about ⅓ of the elastic modulus of the formulation 102 when cured. In another embodiment, the elastic modulus of the first and second plurality of toughening particles 104, 106 ranges between about ¹⁄₁₀₀ to ⅓ of the elastic modulus of the formulation 102 when cured. In certain embodiments, the formulation 102 may be in its cured state after a thermal treatment of about 420° F. for about 6 h.

In an embodiment, the first plurality of toughening particles 104 may be provided in a concentration ranging between about 2 to 10 wt. %, based upon the total weight of the polymer composition 100. In another embodiment, the first plurality of toughening particles 104 may be provided in a concentration ranging between about 2 to 7 wt. %. In other embodiments, the first plurality of toughening particles 104 may be provided in a concentration ranging between about 3.5 to 7 wt. %. The second plurality of toughening particles 106 may be provided in a concentration ranging between about 10 to 25 wt. % on the basis of the total weight of the polymer composition 100.

In additional embodiments, the first and second plurality of toughening particles 104, 106 may be selected with sizes within specified ranges. In an embodiment, the diameter of the first plurality of toughening particles 104 may be less than about 1 μm. In another embodiment, the diameter of the first plurality of toughening particles 104 may be less than about 500 nm. In another embodiment, the diameter of the first plurality of toughening particles 104 may be less than about 300 nm. In a further embodiment, the diameter of the second plurality of toughening particles 106 may be less than about 75 μm. In an additional embodiment, the diameter of the second plurality of toughening particles 106 may range between about 1-75 μm.

In an embodiment, a first plurality of toughening particles 104 may comprise core-shell particles. Core shell particles may comprise an inner core portion and an outer shell portion which substantially encases the inner core portion. In an embodiment, the core portion of the first plurality of toughening particles 104 may comprise a silicone rubber. The outer shell of the first plurality of toughening particles may comprise an acrylic. An example of the core shell particles includes MX660, manufactured by Kaneka, Corp.

In another embodiment, the second plurality of toughening particles 106 may comprise particles of a thermoplastic material. Examples of thermoplastics suitable for use in the toughening particles 106 may include, but are not limited to, polyimides, polyether ketone (PEK), polyether ketone ketone (PEKK), polyether ether ketone (PEEK), polyether imide, polyether sulfones, and polyphenylene oxide (PPO).

The polymer composition 100, including the toughening particles 104, 106, may be further formed into a desired article in block 210. The polymer composition 100 may be placed within a mold or other confinement vessel of selected shape and cured at elevated temperature, optionally, under pressure. The composition 100 may be cured at temperatures ranging between about 375 to 440° F. for about 6 to 12 h and at pressures ranging between about 80 to 110 psi.

Figure 3A:
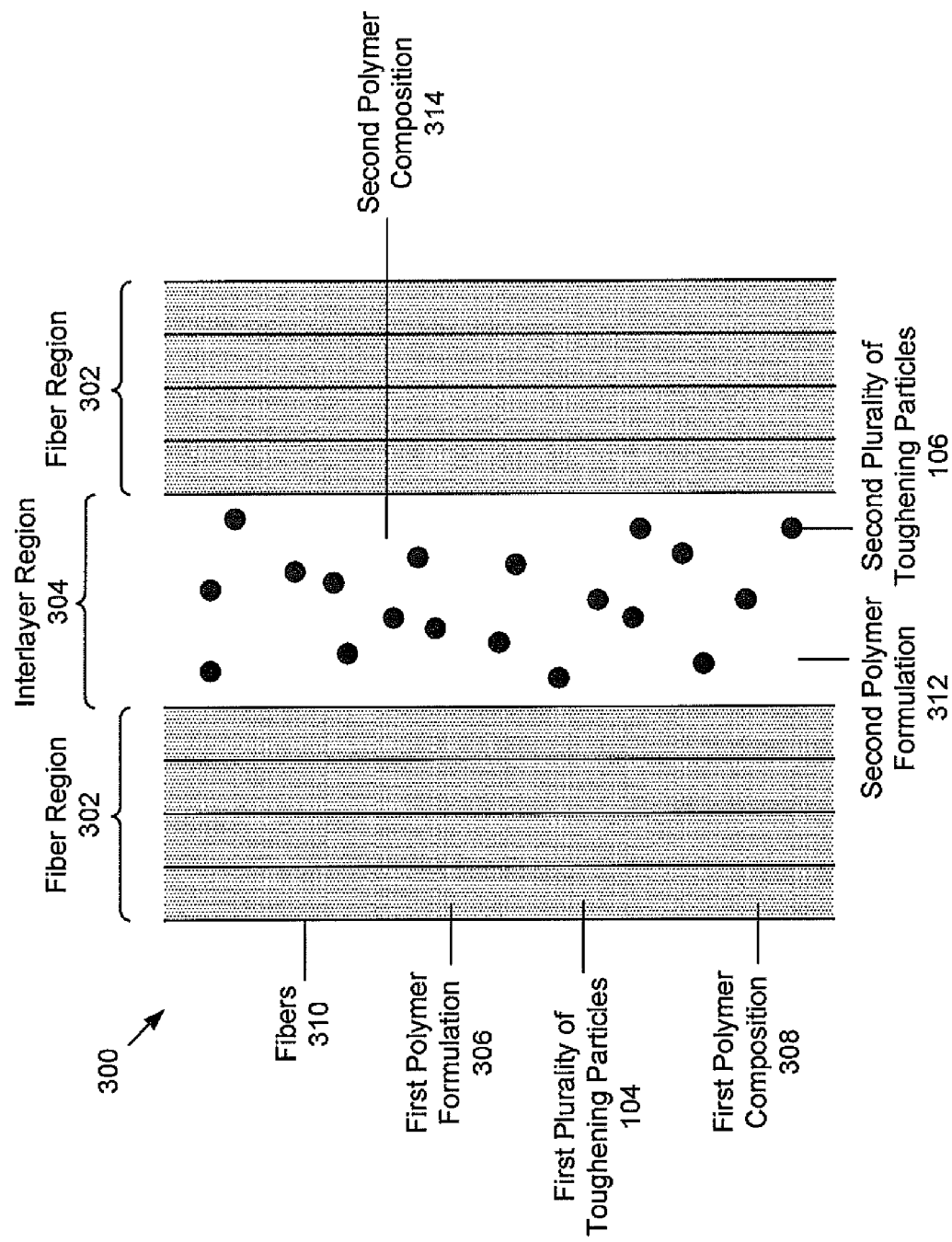
FIGS. 3A-3B are schematic illustrations of embodiments of fiber-reinforced, particle toughened polymer composites comprising primary and secondary toughening particles; (A) primary toughening particles are present in the fiber region of the composite; (B) primary toughening particles are present in the fiber and interlayer regions of the composite.
Figure 3B:
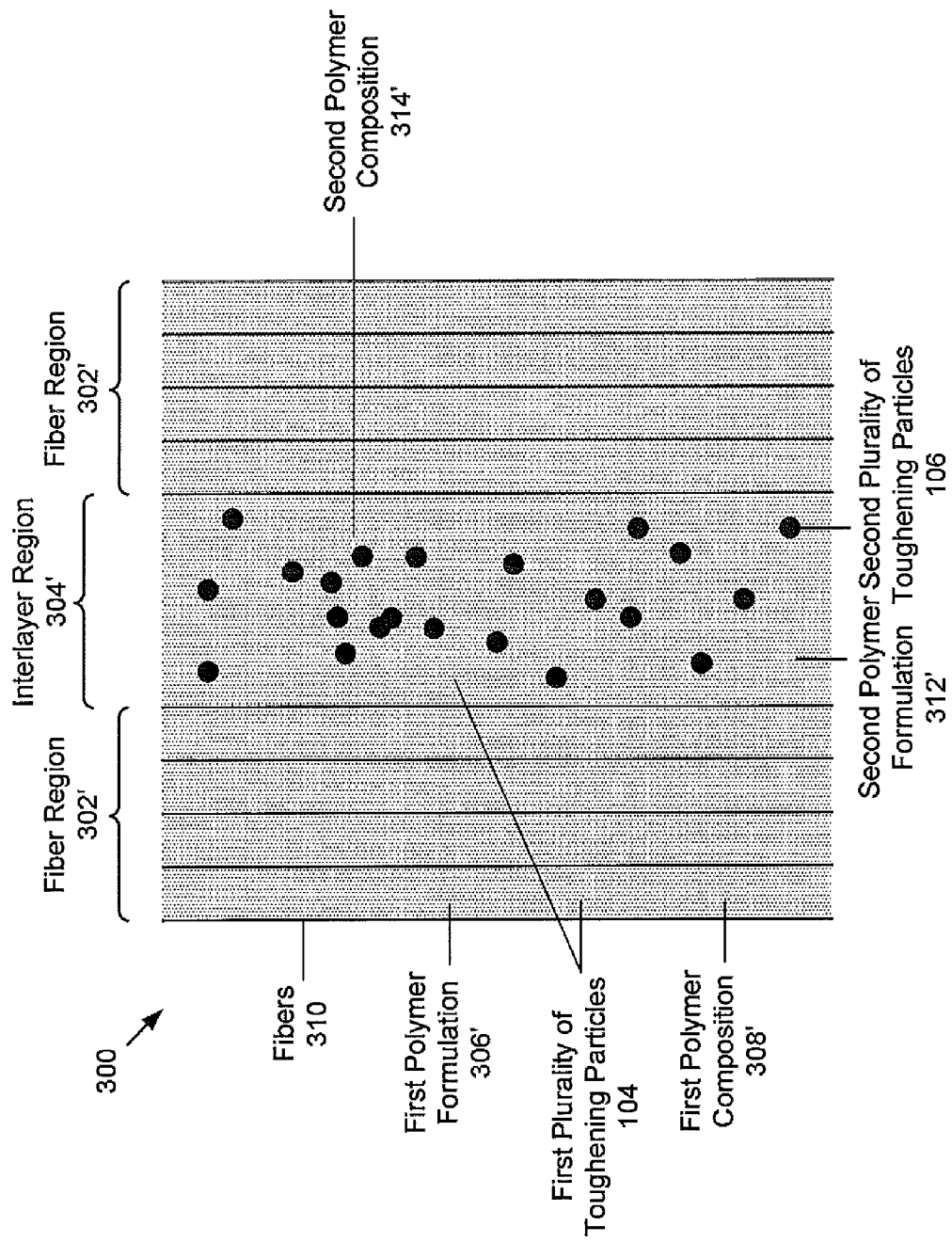

Embodiments of the composition 100 may also be employed for fabricating composites as well. FIGS. 3A-3B illustrate embodiments of fiber-reinforced, particle-toughened composites 300, 350. In an embodiment, the composite 300 of FIG. 3A may comprise a first region 302 and a second region 304. The first region 302 may comprise a plurality of fibers 310 and a first polymer formulation 306 and may be alternatively referred to as the fiber region 302 of the composite 300. The second region 304 is located between the fiber regions 302 and comprises a second polymer formulation 312. The second region 304 may be alternatively referred to as the interlayer region 304 of the composite 300. In certain embodiments, the first and second polymer formulations 306, 312 may be the same. In alternative embodiments, the first and second polymer formulations 306, 312 may be different.

In certain embodiments of the composite 300, a portion of first plurality of toughening particles 104 may extend a relatively short distance within the interlayer region 304 from the fiber region 302. For example, the first toughening particles 104 may extend a distance less than about 25 μm from the edge of the fiber region 302.

In an alternative embodiment, a composite 350 such as that illustrated in FIG. 3B may be formed. The composite 350 may comprise fiber and interlayer regions 302' and 304'. The fiber region 302' may comprise a first polymer formulation 306' including the base polymer formulation 102 discussed above and the first plurality of toughening particles 104. The interlayer region 304' may comprise a second polymer formulation 312' including the base polymer formulation 102 discussed above and both the first and second plurality of toughening particles 104, 106.

In certain embodiments, it may be advantageous to form composites 300 as illustrated in FIG. 3A with the first and second plurality of toughening particles 104, 106 in separate regions. As discussed below, composite embodiments comprising core shell rubbers within the fiber region 302 and polyimide toughening particles within the interlayer region 304 of the composite 300 exhibit improvements in toughness with core shell concentration, while CAI strength is relatively unchanged. In contrast, composite embodiments comprising core shell rubbers within the fiber region 302 and both core shell rubbers and polyimide toughening particles within the interlayer region 304 of the composite 300 exhibit improvements in toughness with core shell concentration while CAI strength is reduced.

Without being bound by theory, it is believed that the presence of the CSR particles within the interlayer region 304 may substantially interfere with one or more interactions between the second plurality of toughening particles 106 and the second polymer formulation 312. The reduction in CAI strength is attributed to this interference. Examples of interactions may include, but are not limited to, wetting of the second plurality of toughening particles and/or absorption of a portion of the base polymer formulation by the secondary particles. In certain embodiments, an interaction that is substantially inhibited may be understood as an interaction which is reduced by greater than 10%, greater than 20%, greater than 30%, greater than 40%, greater than 50%, greater than 60%, greater than 70%, greater than 80%, and greater than 90% when both the first and second plurality of particles 104, 106 are also present within the second polymer formulation 312, as compared to that same interaction when the first plurality of particles 104 are not present within the second polymer formulation 312.

However, in other embodiments, composites 350 may be formed as discussed above with respect to FIG. 3B, where the first and second toughening particles 104, 106 are located within the interlayer region 304'. In these embodiments, the second plurality of toughening particles 106 may be selected such that interactions between the second polymer formulation 312' and the second plurality of toughening particles 106 are not substantially inhibited by the presence of the first plurality of toughening particles 104 within the second polymer formulation 312'. Embodiments of the second plurality of toughening particles 106 for the composite 350 may include, but are not limited to, polyether ether ketones (PEEK), polyether ketones (PEK), polyphenylene oxides (PPO), polyether imides, and polyether sulfones.

Figures 4A, 4B:
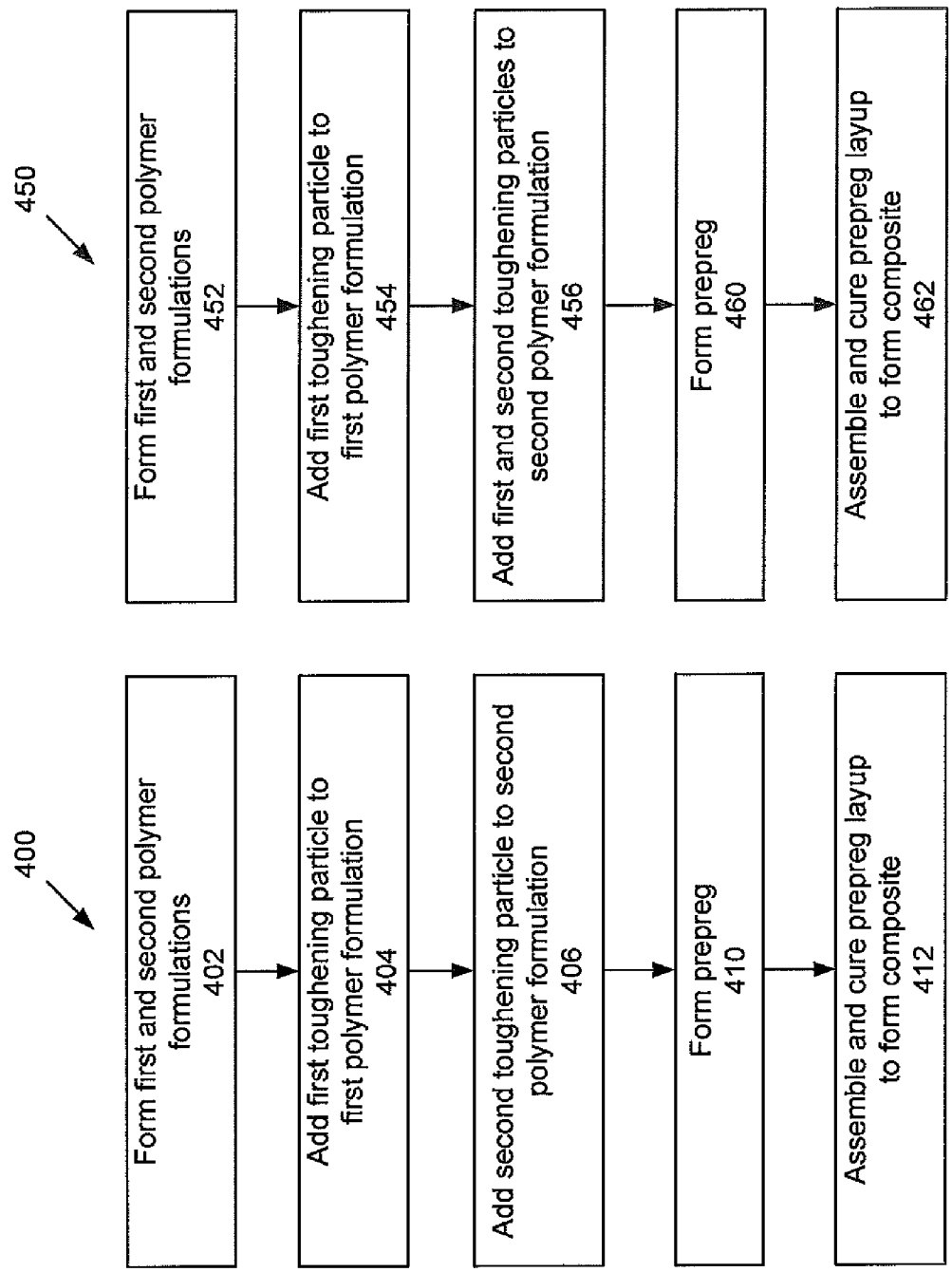
FIGS. 4A-4B illustrate embodiments of methods of making the polymer composites of FIGS. 3A-3B.

FIGS. 4A-4B illustrate embodiments of methods 400, 450 for forming the composites 300, 350. It may be understood that the operations of the methods 400, 450 may be performed in a different order and fewer or greater operations than those illustrated in FIGS. 4A-4B may be performed without limit.

In block 402 of the method 400 the first and second matrix materials 306, and 312 are formed, respectively, for the first and second regions 302, 304 of composite 300. Likewise, in block 452 of the method 450, the first and second matrix materials 306' and 312' are formed, respectively for the first and second regions 302', 304' of composite 350. In a certain embodiments the first and second polymer formulations 306, 312 and 306', 312' may be the same. In other embodiments, the first and second polymer formulations 306, 312 and 306', 312' may be different from one another. In an embodiment, the first and second polymer formulations 306, 312, and 306', 312' may comprise the base polymer formulation 102 discussed above and be manufactured in a similar manner.

In blocks 404-406 of the method 400, the first and second toughening particles 104, 106 may be added to their respective polymer formulations, 306, 312 to form first and second polymer compositions 308, 314. In composite 300, the first plurality of particles 104 may be provided in the fiber region 302 in a concentration ranging between about 2 to 10 wt. %, based upon the weight of the first polymer composition 308. In another embodiment, the first plurality of particles 104 may be provided in a concentration ranging between about 2 to 7 wt. % based upon the weight of the first polymer composition 308. In other embodiments, the first plurality of particles 104 may be provided in a concentration ranging between about 3.5 to 7 wt. % based upon the weight of the first polymer composition 308. The second plurality of particles 106 may be provided in a concentration ranging between about 15 to 25 wt. % on the basis of the weight of the second polymer composition 314.

Similarly, in blocks 454-456 of method 450, the first and second toughening particles 104, 106 may be added to their respective polymer formulations, 306', 312' to form first and second polymer compositions 308', 314'. In composite 350, the first plurality of particles 104 may be provided in both the fiber and interlayer regions 302', 304', respectively, in a concentration ranging between about 2 to 10 wt. %, based upon the total weight of the first or second polymer composition 308', 314'. In another embodiment, the first plurality of particles 104 may be provided in both the fiber and interlayer regions 302', 304', respectively, in a concentration ranging between about 2 to 7 wt. % based upon the total weight of the first or second polymer composition 308', 314'. In other embodiments, the first plurality of particles 104 may be provided in both the fiber and interlayer regions 302', 304', respectively, in a concentration ranging between about 3.5 to 7 wt. % based upon the total weight of the first or second polymer composition 308', 314'. The second plurality of particles 106 may be provided in a concentration ranging between about 15 to 25 wt. % on the basis of the weight of the second polymer composition 314'.

The size of the first and second plurality of toughening particles 104, 106 may be selected to fall within specified ranges. In an embodiment, the diameter of the first plurality of particles 104 may be less than about 1 μm. In another embodiment, the diameter of the first plurality of particles 104 may be less than about 500 nm. In another embodiment, the diameter of the first plurality of particles 104 may be less than about 300 nm.

In a further embodiment, the diameter of the second plurality of particles 106 may be selected so as to be greater than the mean separation distance between the fibers 310 of the fiber region 302 of the composite 300. In an embodiment, the diameter of the second plurality of particles 106 may be less than about 75 µm. In an additional embodiment, the diameter of the second plurality of particles 106 may range between about 1-75 µm.

Figure 5A:
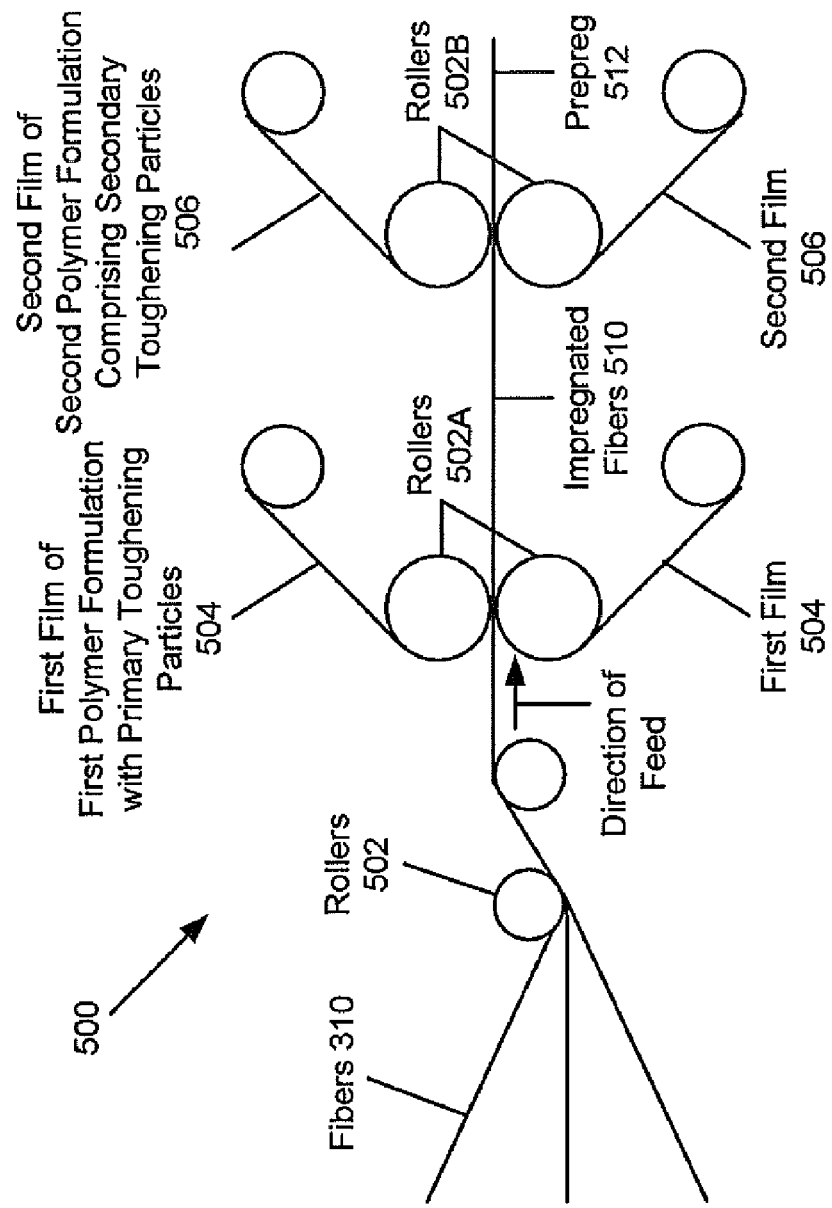
FIGS. 5A-5B illustrate embodiments of systems for forming the polymer composites of FIGS. 3A-3B.

In blocks 410 and 460, prepregs may be formed for the composites 300, 350. FIG. 5A illustrates an embodiment of a system 500 for forming prepregs 512 for composite 300. The system 500 receives the fibers 310 and a plurality of first and second films 504 and 506. The first plurality of films 504 may comprise films of the first polymer composition 308' (e.g., polymer formulation 306 and first plurality of toughening particles 104). The second plurality of films 506 may comprise films of the second polymer composition 314 (e.g., polymer formulation 312 and second plurality of toughening particles 106). The first and second plurality of films 504, 506 may be further guided by rollers 502 to press the films 504, 506 against a feed of the fibers 310, enabling incorporation of the films 504, 506 into the fibers 310. In certain embodiments, the first and second plurality of films 504, 506 may be heated before, during, or after contact with the fibers 310 to a temperature sufficient to soften the films 504, 506.

For example, as illustrated in FIG. 5A, the first plurality of films 504 may be pressed against the top and bottom of fibers 310 as the fibers 310 move adjacent rollers 502A carrying the films. As a result, the first film 504, including the first plurality of toughening particles 104, may be at least partially impregnated into the fibers 310, yielding impregnated fibers 510. As further illustrated in FIG. 5A, the second plurality of films 506 may be subsequently pressed against the top and bottom of the impregnated fibers 510 by rollers 502B to yield prepregs 512. In an embodiment, the first plurality of films 504 may be infiltrated into the fibers 310 at a temperature ranging between about 210 to 280° F., while the second plurality of films 506 may be incorporated into the impregnated fibers 510 at temperatures ranging between about 140 to 150° F.

Figure 5B:
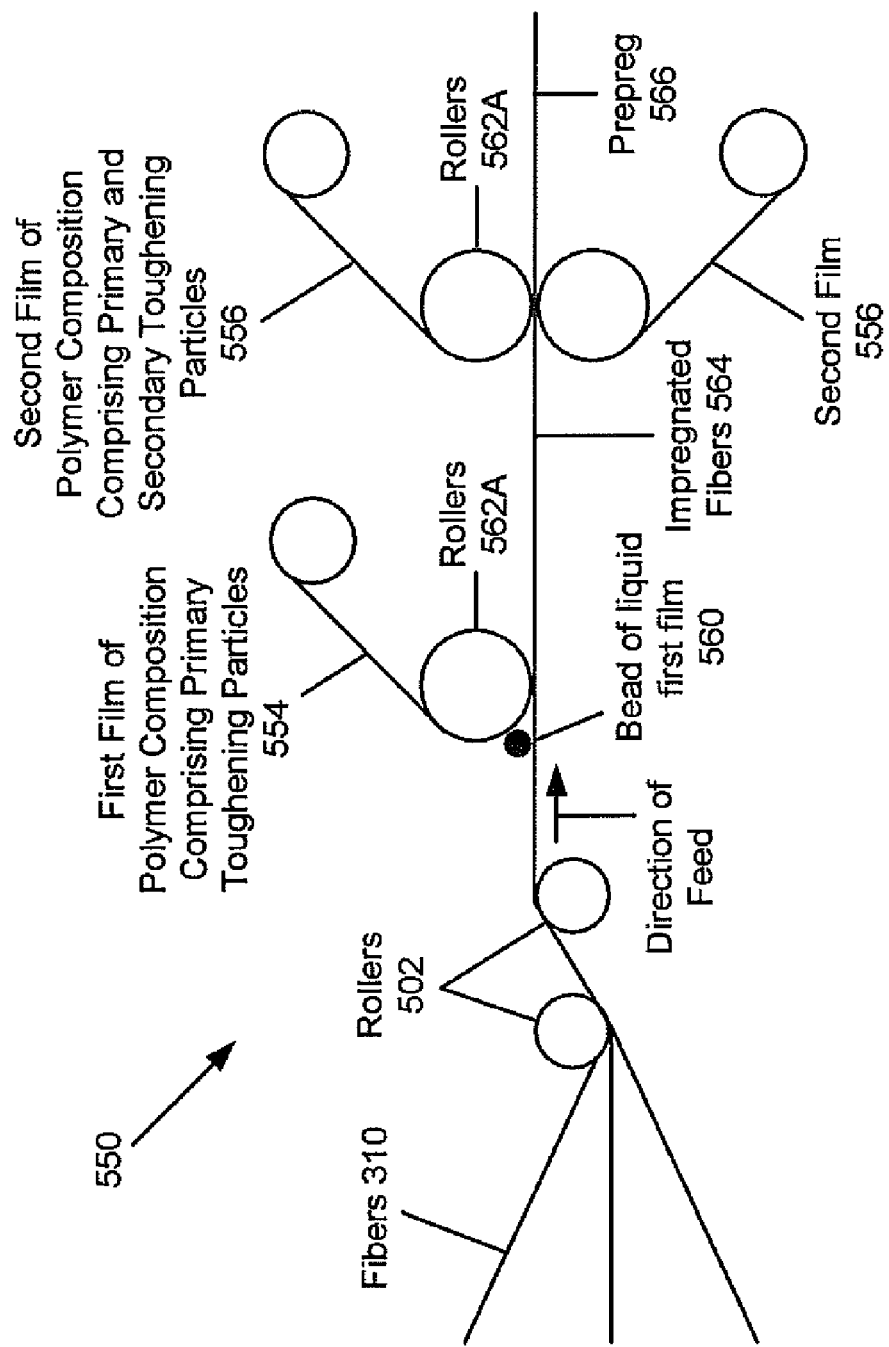

FIG. 5B illustrates an embodiment of a system 550 for forming prepregs 566 for composite 350. The system 550 receives the fibers 310 and a plurality of first and second films 554 and 556. The first plurality of films 554 may comprise films of the first polymer composition 308' (e.g., polymer formulation 306' and the first plurality of toughening particles 104), as discussed above with respect to the method 400. The second plurality of films 556 may comprise films of the second polymer composition 314' (e.g., polymer formulation 312' and the first and second plurality of toughening particles 104, 106).

The first and second films 554, 556 may be incorporated with the fibers 310 to form prepregs 566 in the following manner. The first films 554 may be at least partially melted in advance of one or more rollers 562A, which then receive both the melted bead 560 of first film 504 and the fibers 310. The roller 562A applies pressure on the bead 560, causing the bead 560 to be at least partially impregnated in the fibers 310 and yielding impregnated fibers 564. Subsequently, the second plurality of films 506 may be pressed against the top and bottom of the impregnated fibers 564 by rollers 562B to yield prepregs 566.

The prepregs 512, 566 so formed may be assembled into layups and cured to form composites in blocks 412, 462. In certain embodiments, the layups may be placed on tooling in order to impart a selected shape to the final composite product. Layups may be further cured by the application of one or more of temperature and pressure. For example, curing may be performed at temperatures ranging between about 375 to 440° F. for about 6 to 12 h. When present, applied pressures may range between about 80 to 110 psi. The resultant composites may comprise fiber volume fractions ranging between about 60 to 70 vol. %.

EXAMPLES

In the examples below, the thermal and mechanical performance of embodiments of toughened BMI compositions and BMI composites of the present disclosure are discussed in detail. In particular, mechanical properties, including mode I critical energy release rate (toughness), compression after impact strength, glass transition temperature, and long term thermal durability are investigated. Notably, it is discovered that the addition of selected toughening particles may enhance at least one of toughness and compression after impact strength while maintaining the thermal stability. These examples are discussed for illustrative purposes and should not be construed to limit the scope of the disclosed embodiments.

Example 1

Particle-Toughened BMI Compositions (a) Preparation

A base polymer composition was formed by combining a plurality of bismaleimide resins, an aliphatic BMI, a BMI co-reactant, a low viscosity epoxy, an inhibitor, and a flow control agent. These components of the polymer composition were added to a mixing vessel and mixed together until substantially homogeneous, for example, at speeds ranging between about 50 to 200 rpm. To assist the mixing process, the mixture was heated to temperatures of up to about 250° F. for times ranging between about 30 to 60 min.

Two BMI resins were employed in the composition, hexamethylene diamine bismaleimide, HMDA-BMI (GP-207R, Cymer) and 4,4-bismaleimidodiphenyl methane (Matrimid 5292B, Huntsman. The aliphatic BMI employed was toluene diamine BMI, TDA-BMI (SR 10572, Evonic). The BMI co-reactant was o,o-diallyl bisphenol A (Matrimid 5292B, Huntsman). The low viscosity epoxy employed was bisphenol F (GY 285, Huntsman). The inhibitor was 1,4-napthoquinone hydrate. The flow control agent comprised a thermoplastic polyimide (Matrimid 9725, Huntsman).

Once the base polymer composition was formed, the primary and secondary toughening particles were added to the composition and mixing was continued until the particles were substantially homogeneously distributed within the composition. The primary particles comprised core shell rubber particles having a silicone rubber core and an acrylic shell (MX660, Kaneka Corp) having a mean diameter ranging between about 100 to 300 nm. The secondary particles comprised polyimide particles having a mean size of about 1200 mesh (approximately 10 to 20 µm).

The components and their concentrations, on the basis of the total weight of the composition, including the toughening particles, are illustrated below in Table 1. The concentration of the core shell particles was varied to examine the effects of core shell loadings, while the concentration of the polyimide particles was kept approximately constant.

TABLE 1

BMI Composition

| Material | Concentration (wt. %) |
|---|---|
| BMI Resin (Matrimid 5292A) | 20-26 |
| BMI Resin - TDA-BMI (SR 10572) | 12.5-18.5 |
| Aliphatic BMI - HMDA-BMI (GP-207-R) | 5-10 |
| BMI co-reactant - 4,4-bismaleimidodiphenyl methane (Matrimid 5292B) | 24-30 |
| Epoxy (GY 285) | 3-7 |
| Inhibitor - 1,4-napthoquinone hydrate | 0.5-1 |
| Thermoplastic - Polyimide (Matrimid 9725) | 0.5-3 |
| Primary toughening particles - Core Shell Rubbers (MX660, Kaneka) | 1-5 |
| Secondary toughening particle - Polyimide (P84) | 20 |

Figure 6:
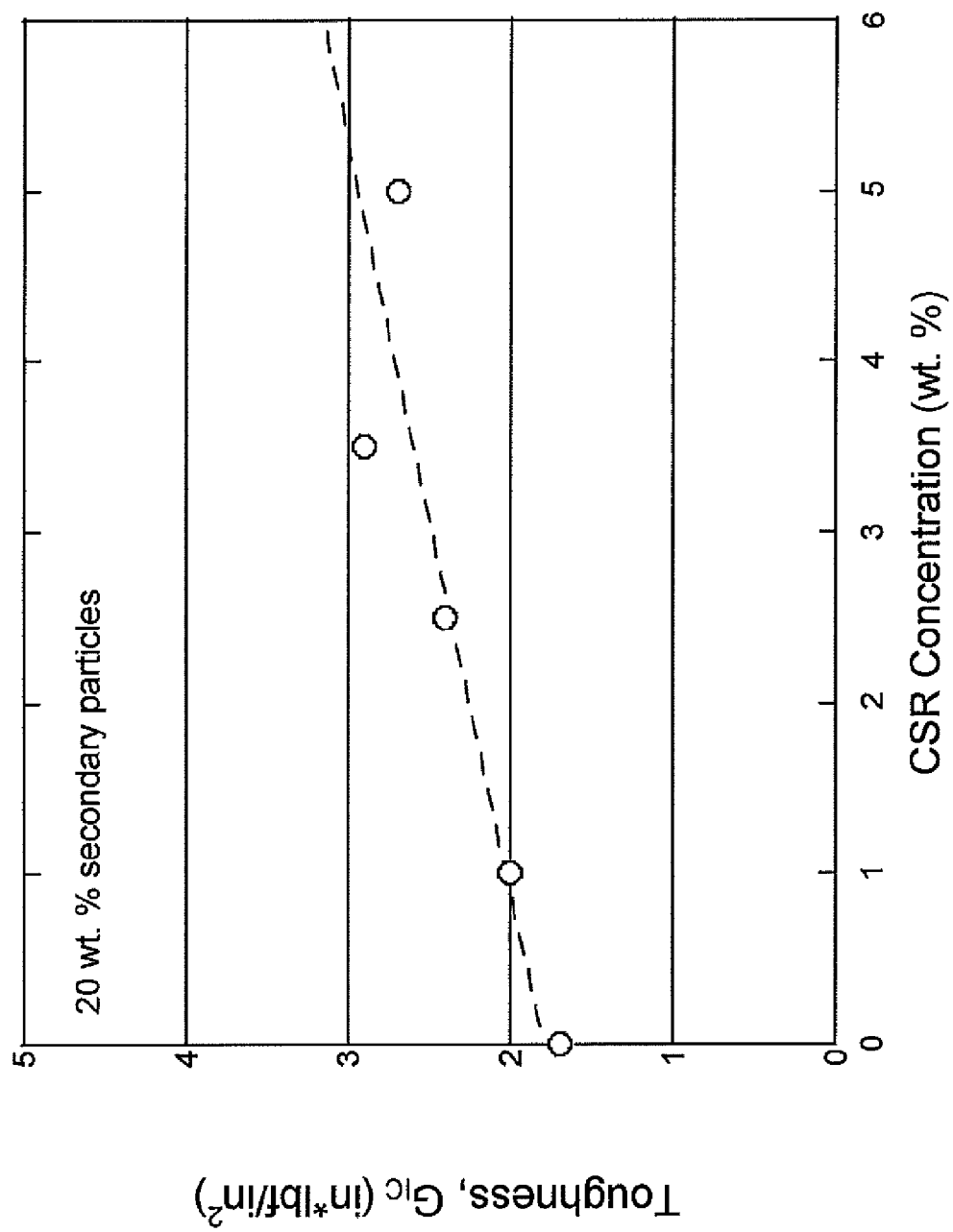
FIG. 6 is a plot of the toughness of an embodiment of a particle toughened BMI composition as a function of the concentration of CSR concentration; the composition comprises primary toughening particles of core shell rubbers (CSR) and secondary toughening particles of polyimides.

(b) Toughness of Particle-Toughened BMI Compositions as a Function of Core Shell Rubber Concentration The toughness of embodiments of particle-toughened BMI compositions having varied core shell rubber concentrations were evaluated according to ASTM D5528, "Standard Test Method for Mode I Interlaminar Fracture Toughness of Unidirectional Fiber-Reinforced Polymer Matrix Composites." The results of toughness testing are illustrated in FIG. 6.

It is found that, in general, the toughness of the BMI compositions increased as the concentration of the core shell rubber particles was increased. For example, the toughness of a control sample, without any CSR reinforcement, ranged between about 1.5-1.8 in*lbf/in$^2$. As CSR particles were added to the composition up to concentrations of about 5 wt. %, the toughness of the BMI compositions rose about 2.9 in*lbf/in$^2$, an increase of about 70%.

Figure 7:
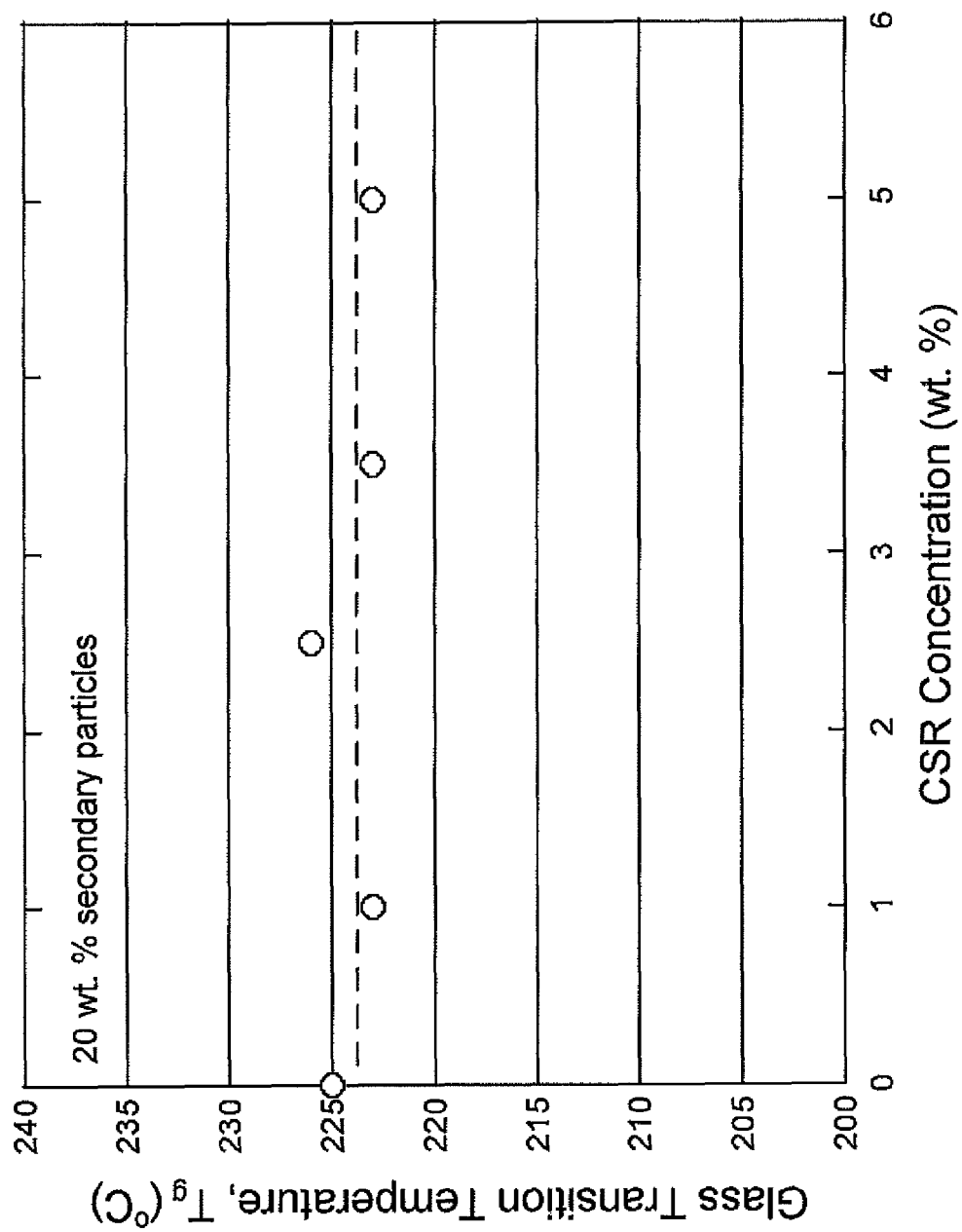
FIG. 7 is a plot of the glass transition temperature ($T_g$) of an embodiment of a particle toughened BMI composition as a function of CSR concentration; the composition comprises primary CSR toughening particles and secondary polyimide toughening particles.

(c) Glass Transition Temperature ($T_G$) of Particle-Toughened BMI Compositions as a Function of Core Shell Rubber Concentration The glass transition temperature of embodiments of particle-toughened BMI compositions having varied core shell rubber concentrations was evaluated in accordance with the ASTM E1545, "Standard Test Method for Assignment of the Glass Transition Temperature by Thermomechanical Analysis," the entirety of which is hereby incorporated by reference. The results of this testing are illustrated in FIG. 7.

It is found that the glass transition temperature of the BMI composition is approximately constant as the concentration of the core shell rubber is increased. For example, the $T_g$ of a control sample without any CSR reinforcement is found to be approximately 225° C. Adding CSR up to about 5 wt. %, the $T_g$ of the BMI composite is found to remain at, or slightly below, this level.

(d) Summary of Composition Testing Results

BMI compositions reinforced with selected toughening particles were found to exhibit a good balance of mechanical and thermal properties. The particles are found to toughen the BMI compositions up to about 70% while substantially no detrimental effect is observed on the glass transition temperature. These observations indicate that embodiments of the disclosed particle-toughened BMI compositions may be employed to replace BMIs in most BMI applications, as well as epoxy applications where high toughness is required.

Example 2

Fiber-Reinforced Composites Comprising Particle-Toughened BMI Compositions

BMI composites were prepared with toughening particles in various configurations in order to demonstrate the effects of these particles on the mechanical and thermal performance of BMI composites.

(a) Preparation

A base BMI composition was prepared as discussed above with respect to Example 1, prior to the addition of the primary core shell toughening and secondary toughening particles. Composites were formed from this base BMI composition using the filming method discussed above with respect to methods 400, 450 and FIGS. 5A and 5B. The concentration primary toughening particles, core shell rubbers, was varied between about 2 to 7 wt. % and the concentration of secondary toughening particles, polyimides, was varied between about 15 to 25 wt. %. Sixteen trial samples were investigated as follows:

Trials 1-4 illustrate testing results for composites formed without primary particles in the fiber region and without secondary toughening particles in the interlayer.

Trials 5-8 illustrate testing results for composites formed with primary toughening particles in the fiber region and without secondary toughening particles in the interlayer region.

Trials 9-12 illustrate testing results for composites formed with primary toughening particles in the fiber region and with secondary toughening particles in the interlayer region.

Trials 13-16 illustrate testing results for composites formed with primary toughening particles in the fiber region and both primary and secondary toughening particles in the interlayer region.

(b) Trials 1-4: Composites with Secondary Toughening Particles within the Interlayer To examine the role of the secondary polyimide toughening particles on the composite performance, BMI composites were fabricated with the secondary toughening particles within the interlayer region and no primary toughening particles within the fiber region. The composite of Trial 1 was a control material comprising a fiber-reinforced BMI composition without either P84 or core-shell particles. The composites of Trials 2-4 comprised fiber-reinforced BMI compositions with 15, 20, and 25 wt. % P84 polyimide particles on the basis of the polymer composition within the interlayer region.

Figure 8:
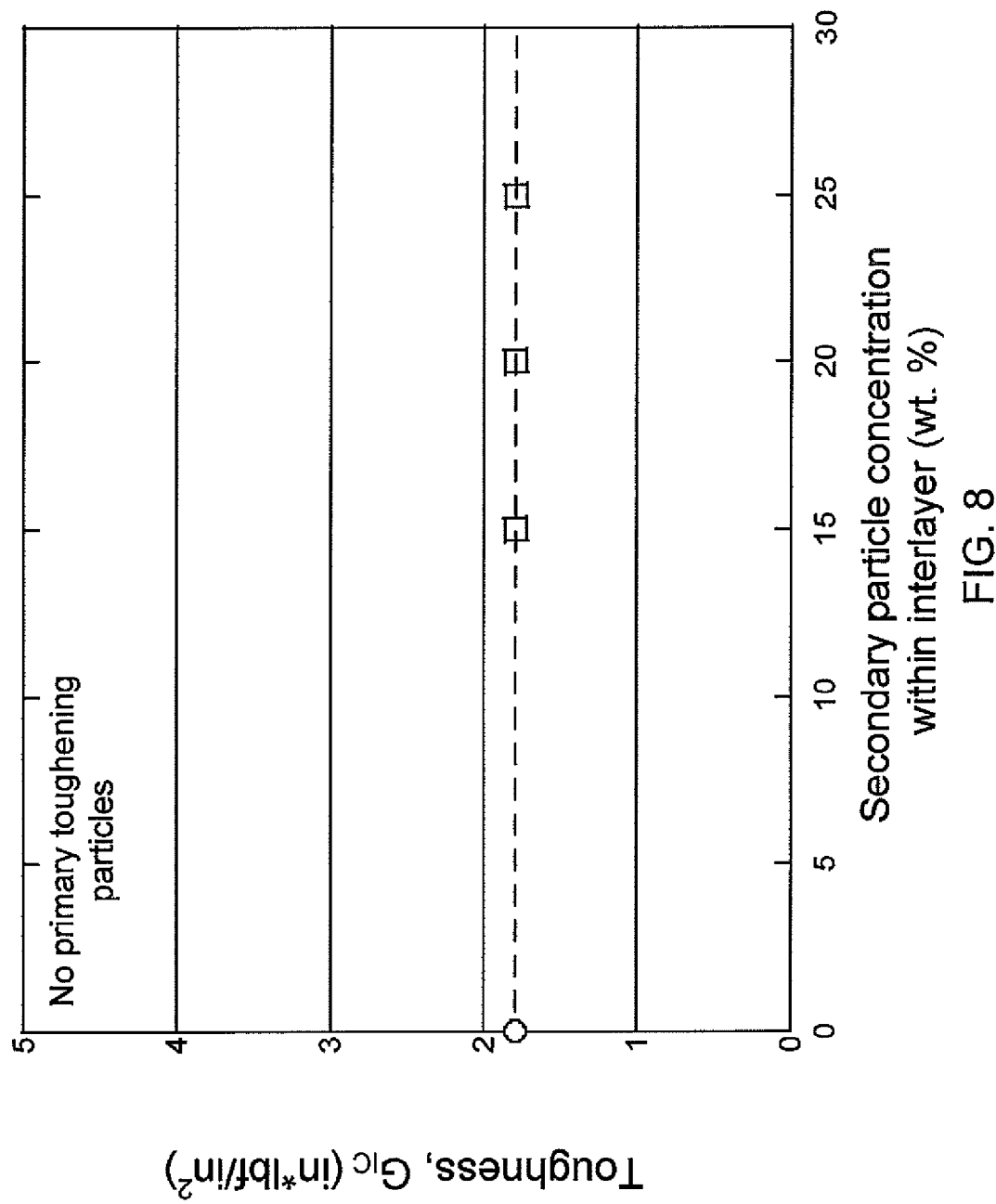
FIG. 8 is a plot of the toughness of an embodiment of a fiber-reinforced, particle toughened BMI composite as a function of the secondary polyimide toughening particle concentration; the composite comprises secondary polyimide toughening particles in an interlayer region between the fiber layers.
Figure 9:
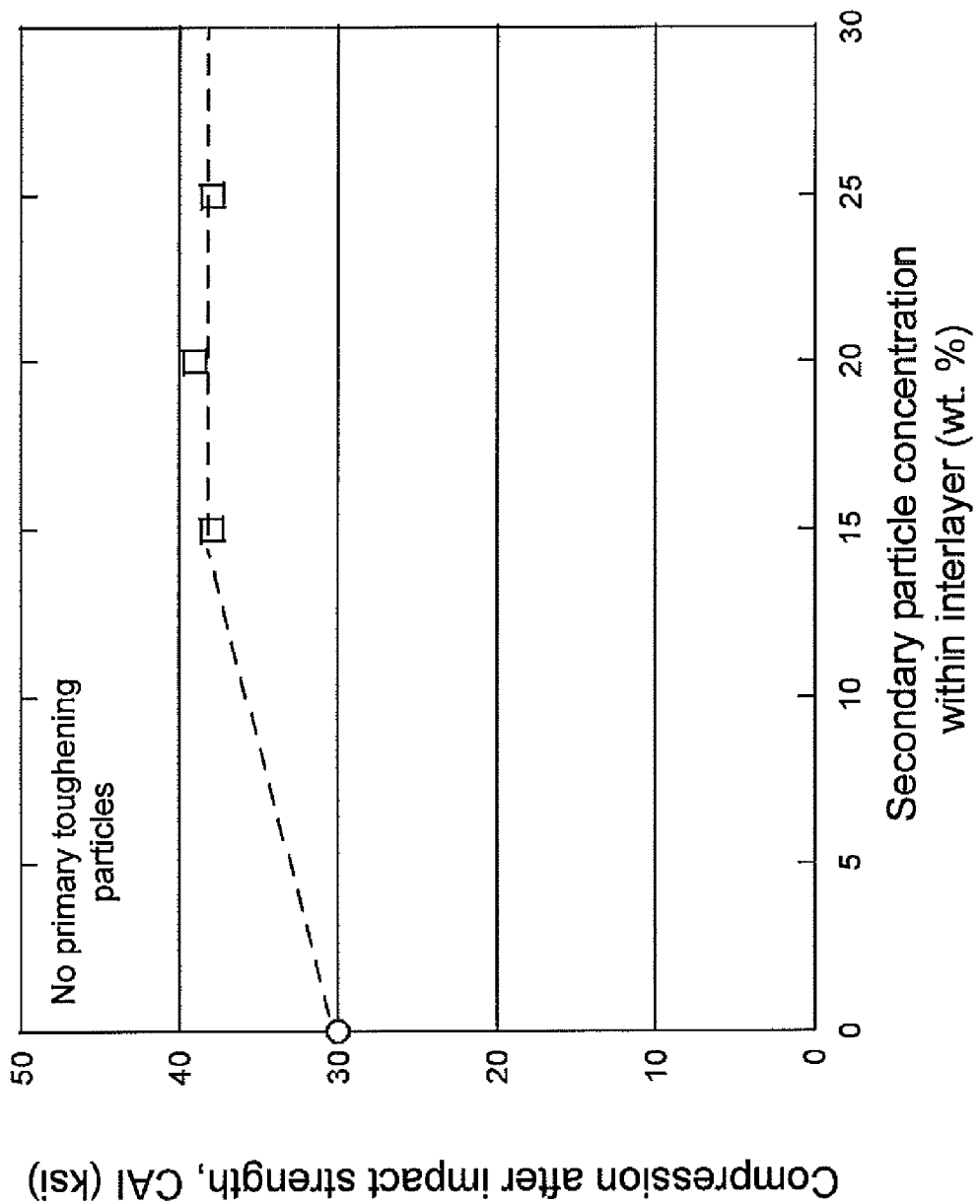
FIG. 9 is a plot of the compression after impact strength (CAI) of an embodiment of a fiber-reinforced, particle toughened BMI composite as a function of the secondary polyimide toughening particle concentration; the composite comprises secondary polyimide toughening particles in the interlayer region between the fiber layers.

To evaluate the mechanical performance of these materials, toughness testing was performed as discussed above in Example 1. CAI testing was also performed in accordance with ASTM D7137, "Standard Test Method for Compressive Residual Strength Properties of Damaged Polymer Matrix Composite Plates," the entirety of which is hereby incorporated by reference. The testing results are illustrated below in Table 2 and FIGS. 8 and 9.

TABLE 2

Testing results of Trials 1-4

| Material | Example | Particulate Concentration (wt. %) | $G_{IC}$ (in*lbf/in$^2$) | CAI (ksi) |
|---|---|---|---|---|
| Fiber-reinforced BMI (Control) | 1 | | 1.8 | 30 |
| Fiber-reinforced BMI/P84-reinforced interlayer | 2 | P84 - 15% | 1.8 | 38 |
| | 3 | P84 - 20% | 1.8 | 39 |
| | 4 | P84 - 25% | 1.8 | 38 |

From these testing results, it may be observed that the toughness remains approximately constant at about 1.8 in*lbf/in$^2$. However, concurrently, a significant increase in the compression after impact strength is observed, from about 30 ksi in the control to about 38-39 as the P84 concentration is increased to 15-25 wt. %, an increase of about 25%. Thus, while the polyimide particles in the interlayer do not exhibit a significant impact upon toughness, they do provide a significant benefit to compression after impact strength.

(c) Trials 5-8: Composites with Primary Toughening Particles within the Fiber Region To examine the effects of the primary CSR toughening particles, BMI composites were fabricated with primary CSR toughening particles within the fiber region of the composite and without secondary polyimide toughening particles within the interlayer region. The composites of Trials 5-8 comprised fiber-reinforced BMI compositions with about 2, 3.5, 5, and 7 wt. % CSR particles in the fiber portion on the basis of the total weight of the fiber portion. The testing results are illustrated below in Table 3 and FIGS. 10 and 11. The control composite of Trial 1, without either P84 or CSR particles, is further illustrated for comparison.

TABLE 3

Testing results of Trials 5-8

| Material | Example | Particulate Concentration (wt. %) | $G_{IC}$ (in*lbf/in$^2$) | CAI (ksi) |
|---|---|---|---|---|
| Fiber-reinforced BMI | 1 | | 1.8 | 30 |
| Fiber-reinforced BMI/ | 5 | CSR - 2% | 2 | 30 |
| CSR-reinforced fiber | 6 | CSR - 3.5% | 2.4 | 30 |
| layer | 7 | CSR - 5% | 2.6 | 30 |
| | 8 | CSR - 7% | 2.9 | 30 |

Figure 10:
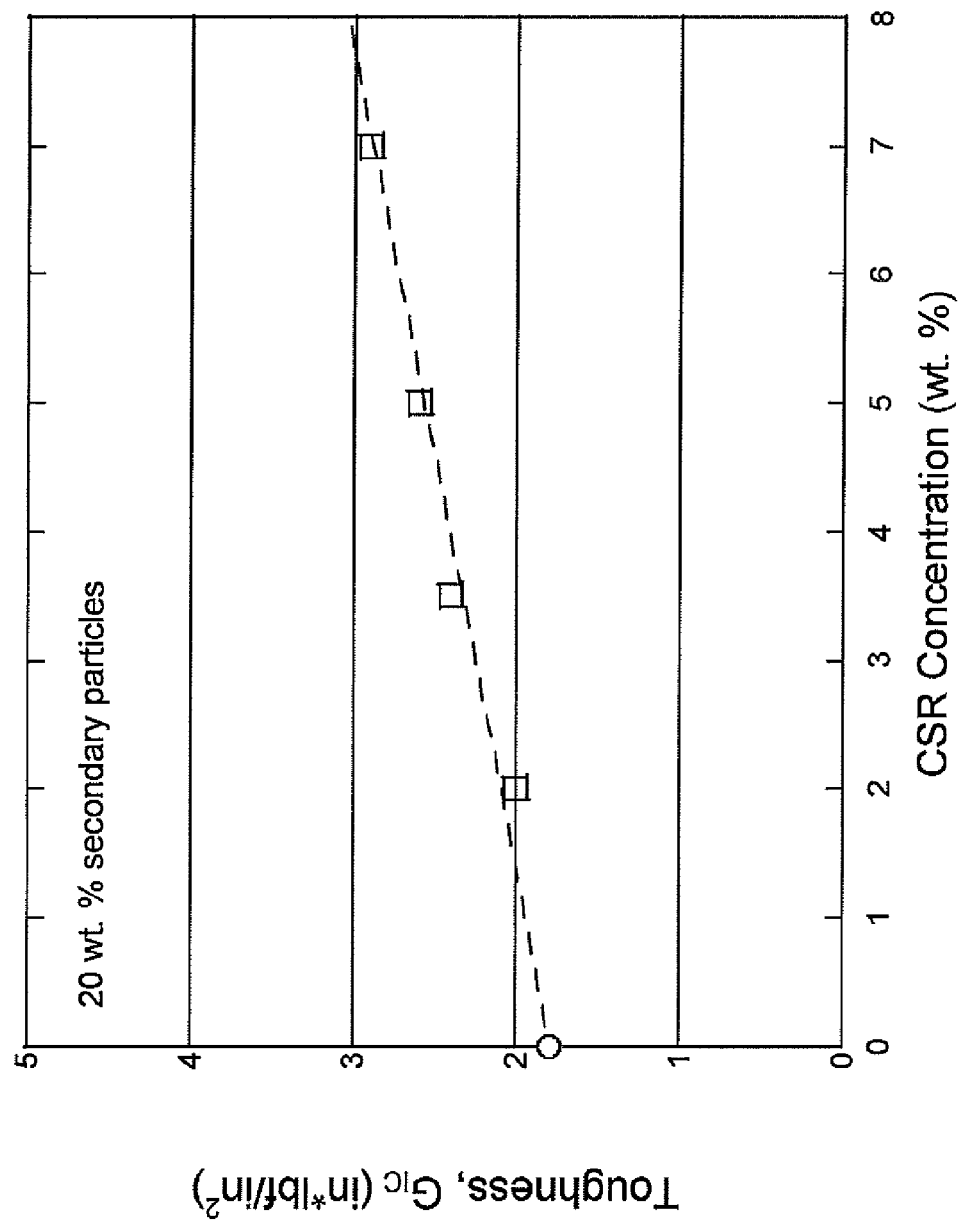
FIG. 10 is a plot of the toughness of an embodiment of a fiber-reinforced, particle toughened BMI composite as a function of the primary CSR toughening particle concentration; the composite comprises primary CSR toughening particles within the fiber region of the composite.
Figure 11:
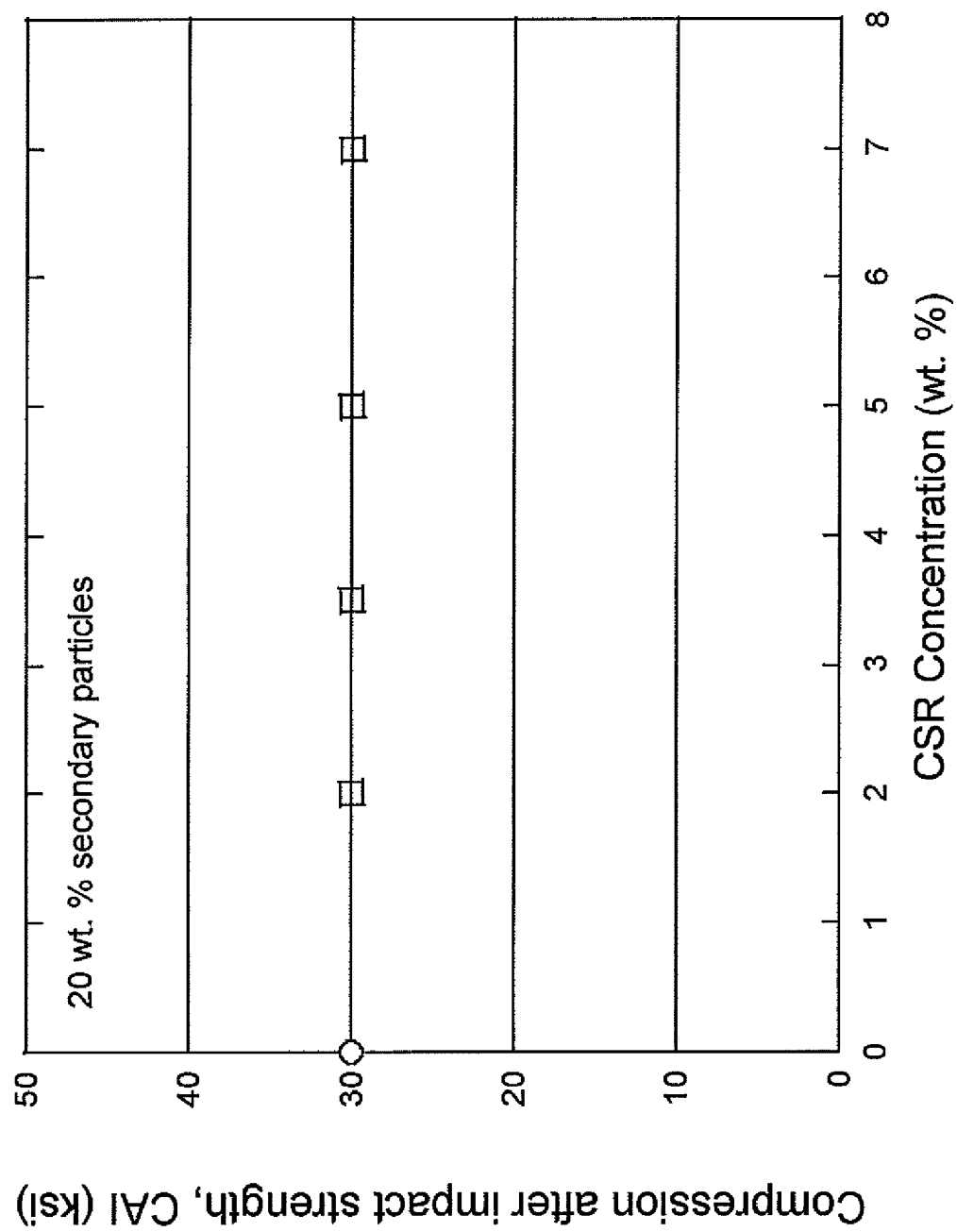
FIG. 11 is a plot of the CAI strength of an embodiment of a fiber-reinforced, particle toughened BMI composite as a function of the primary CSR toughening particle concentration; the composite comprises primary CSR toughening particles within the fiber region of the composite.

From these testing results, it may be observed that the compression after impact strength remains approximately constant at about 30 ksi with increasing CSR concentration (FIG. 11). However, a significant increase in the toughness is observed over the control value, 1.8 in*lbf/in$^2$, with increasing CSR concentration (FIG. 10). For example, the toughness value rises about 10% over the control at about 2 wt. % CSR to about 2 in*lbf/in$^2$. Further increasing the CSR concentration up to about 7 wt. % raises the toughness about 60%, up to about 2.9 in*lbf/in$^2$. Thus, while the CSR particles in the fiber region do not exhibit a significant impact upon CAI, they do provide a significant benefit to toughness.

Figure 12:
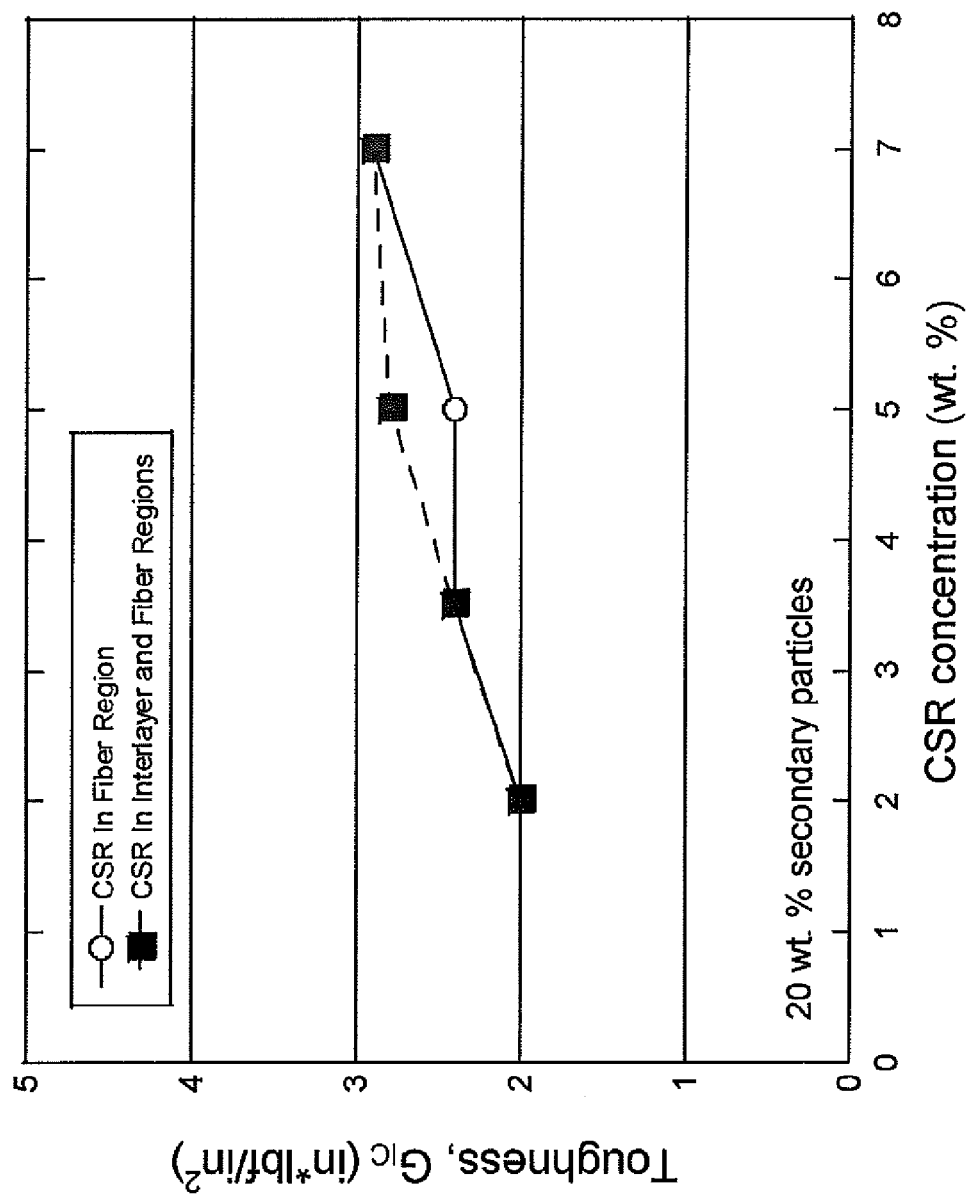
FIG. 12 is a plot of the toughness of embodiments of fiber-reinforced, particle toughened BMI composites as a function of the CSR concentration; a first set of composites comprises primary CSR toughening particles within the fiber region and secondary polyimide toughening particles within the interlayer region of the composite (circles and solid line); a second set of composites comprises primary CSR toughening particles within both the fiber and interlayer regions of the composite and secondary polyimide toughening particles within the interlayer region of the composite (squares, dashed line)
Figure 13:
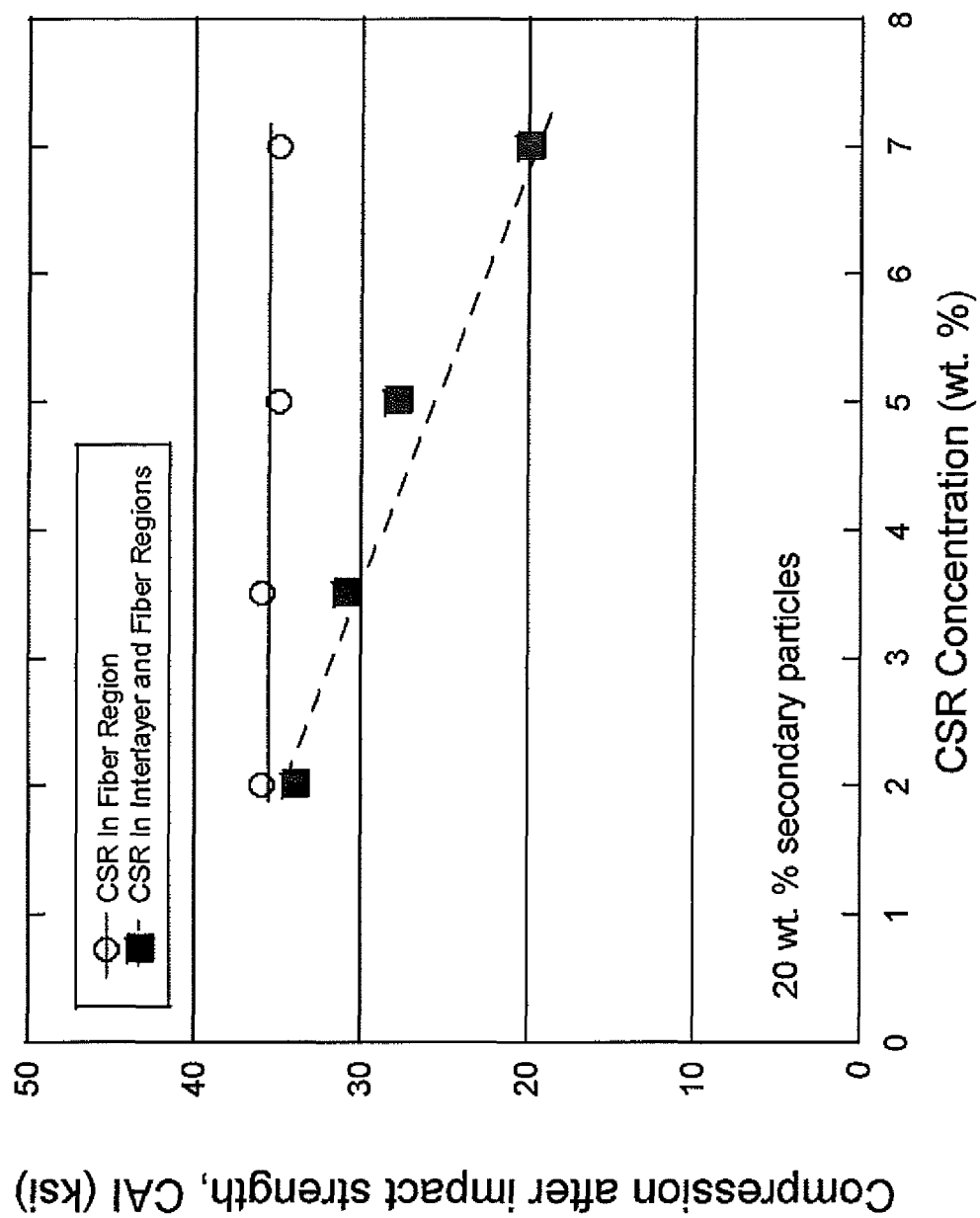
FIG. 13 is a plot of the CAI strength of embodiments of fiber-reinforced, particle toughened BMI composites as a function of the CSR concentration; a first set of composites comprises primary CSR toughening particles within the fiber region and secondary polyimide toughening particles within the interlayer region of the composite (circles and solid line); a second set of composites comprises primary CSR toughening particles within both the fiber and interlayer regions of the composite and secondary polyimide toughening particles within the interlayer region of the composite (squares, dashed line)

(d) Trials 9-16: Composites with Sub-Micron Scale Particles within the Fiber Region and Primary and Secondary Particles within the Interlayer Region To examine the impact of the primary CSR toughening particles and secondary polyimide toughening particles in combination, BMI composites were fabricated with primary toughening particles within the fiber region and either primary particles only within the interlayer region or both primary and secondary toughening particles within the interlayer region. The composites of Trials 9-12 comprised about 20 wt. % secondary polyimide particles in the interlayer region and about 2, 3.5, 5, and 7 wt. % primary CSR toughening particles in the fiber region on the basis of the weight of the polymer composition within the fiber regions. The composites of Trials 13-16 comprised about 20 wt. % secondary polyimide particles in the interlayer region and about 2, 3.5, 5, and 7 wt. % primary CSR toughening particles in the fiber or interlayer regions, respectively on the basis of the weight of the polymer composition within the fiber or interlayer regions. The testing results are illustrated below in Table 4 and FIGS. 12 and 13. By comparison of these two sets of trials, the importance of the respective placement of the primary and secondary toughening particles may be observed.

TABLE 4

Testing results of Trials 9-16

| Material | Example | Particulate Concentration (wt. %) | $G_{IC}$ (in*lbf/in$^2$) | CAI (ksi) |
|---|---|---|---|---|
| Fiber-reinforced BMI/ | 9 | CSR - 2% | 2 | 36 |
| CSR-reinforced fiber | 10 | CSR - 3.5% | 2.4 | 36 |
| layer/P84-reinforced | 11 | CSR - 5% | 2.4 | 35 |
| interlayer | 12 | CSR - 7% | 2.9 | 35 |
| Fiber-reinforced BMI/ | 13 | CSR - 2% | 2 | 34 |
| CSR-reinforced fiber | 14 | CSR - 3.5% | 2.4 | 31 |
| layer and interlayer/ | 15 | CSR - 5% | 2.8 | 28 |
| P84-reinforced | 16 | CSR - 7% | 2.9 | 20 |
| interlayer | | | | |

From these testing results, it may be observed that a significant increase in the composite toughness is observed by increasing the CSR particle concentration from about 2 to 7 wt. %, both when the CSR particles are within the fiber portion and the fiber region and the interlayer region. For example, the toughness increases about 60%, from about 2 to 2.9 in*lbf/in$^2$.

In Trials 9-12, where the CSR particles are positioned in the fiber region, it is found that the CAI strength remains approximately constant with increasing CSR particle concentration, about 34-35 ksi. In contrast, in Trials 13-16, where the CSR particles are positioned both in the fiber region and the interlayer region, the CAI strength exhibits a significant decrease with increasing CSR particle concentration, falling from about 34 ksi at about 2 wt. % CSR particle concentration to about 20 ksi at about 7 wt. % CSR particle concentration.

(e) Thermal Stability

Long term thermal durability tests were also performed to evaluate the influence of the CSR and polyimide toughening particles on thermal stability of composite embodiments. Long term thermal durability tests were conducted on the composite of Trial 3, which comprised about 20 wt. % of secondary P84 toughening particles within the interlayer region of the composite, and the composite of Trial 11, which comprised about 20 wt. % of secondary P84 toughening particles within the interlayer region and about 5 wt. % of primary CSR toughening particles in the fiber region. Thermal stability of each composite was evaluated at temperatures of about 275, 300, and 350° F. over a period of about 150 days and the testing results are illustrated in FIGS. 14A-14C.

Figure 14A:
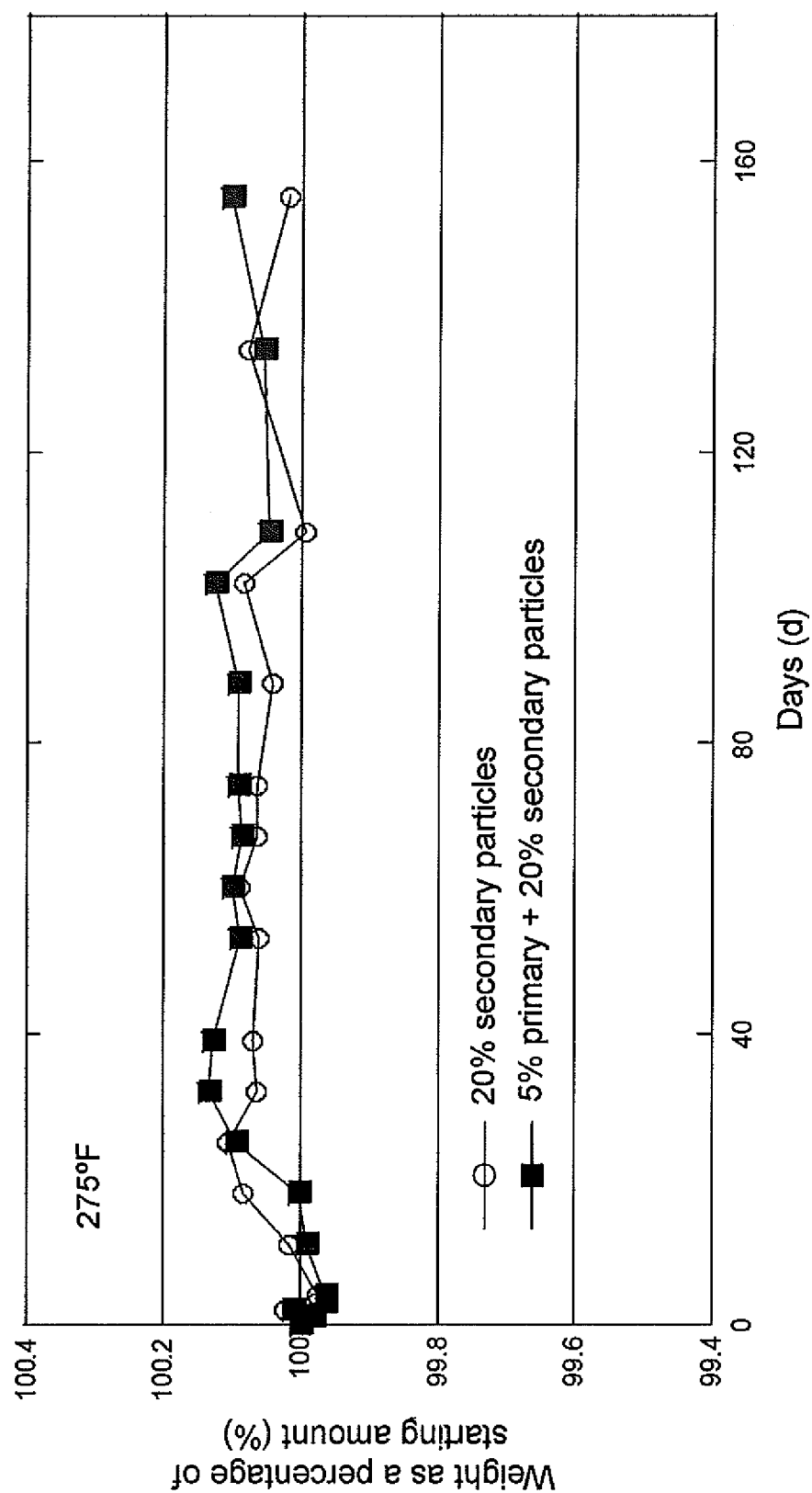
FIGS. 14A-14C are plots of the thermal stability of embodiments of fiber-reinforced, particle toughened BMI composites; a first composite comprises secondary polyimide particles in the interlayer region of the composite and a second composite comprises primary CSR toughening particles within the fiber region of the composite and secondary polyimide toughening particles within the interlayer region of the composite; (A) 275° C.; (B) 300° C.; (C) 350° C.
Figure 14B:
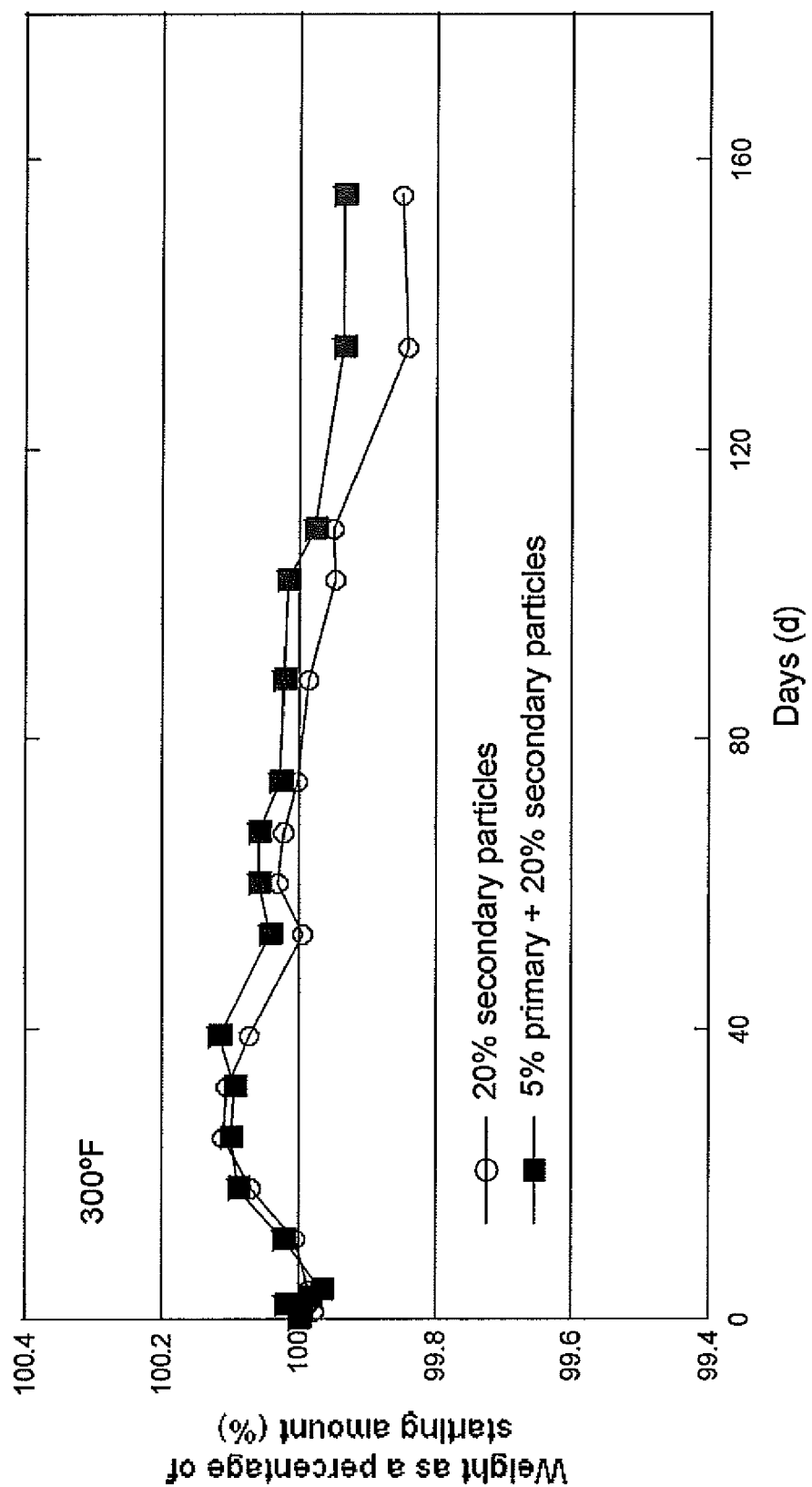

FIGS. 14A and 14B illustrate the testing results at 275° F. and 300° F. It may be observed that during exposure at about 275° F., each of the composites exhibited substantially no weight loss up to and including about 150 hours. During exposure at about 300° F., each of the composites exhibits substantially no weight loss up to about 75 to 80 days. After about 75-80 days, each of the composites exhibited slight weight loss, less than about 0.2%, with additional time at temperature. The composite of trial 3, comprising the secondary P84 toughening particles alone, exhibited approximately 0.15% weight loss after about 150 days. The composite of trial 11, comprising both the primary CSR toughening particles and the secondary P84 toughening particles, exhibited less than about 0.1% weight loss after about 150 days.

Figure 14C:
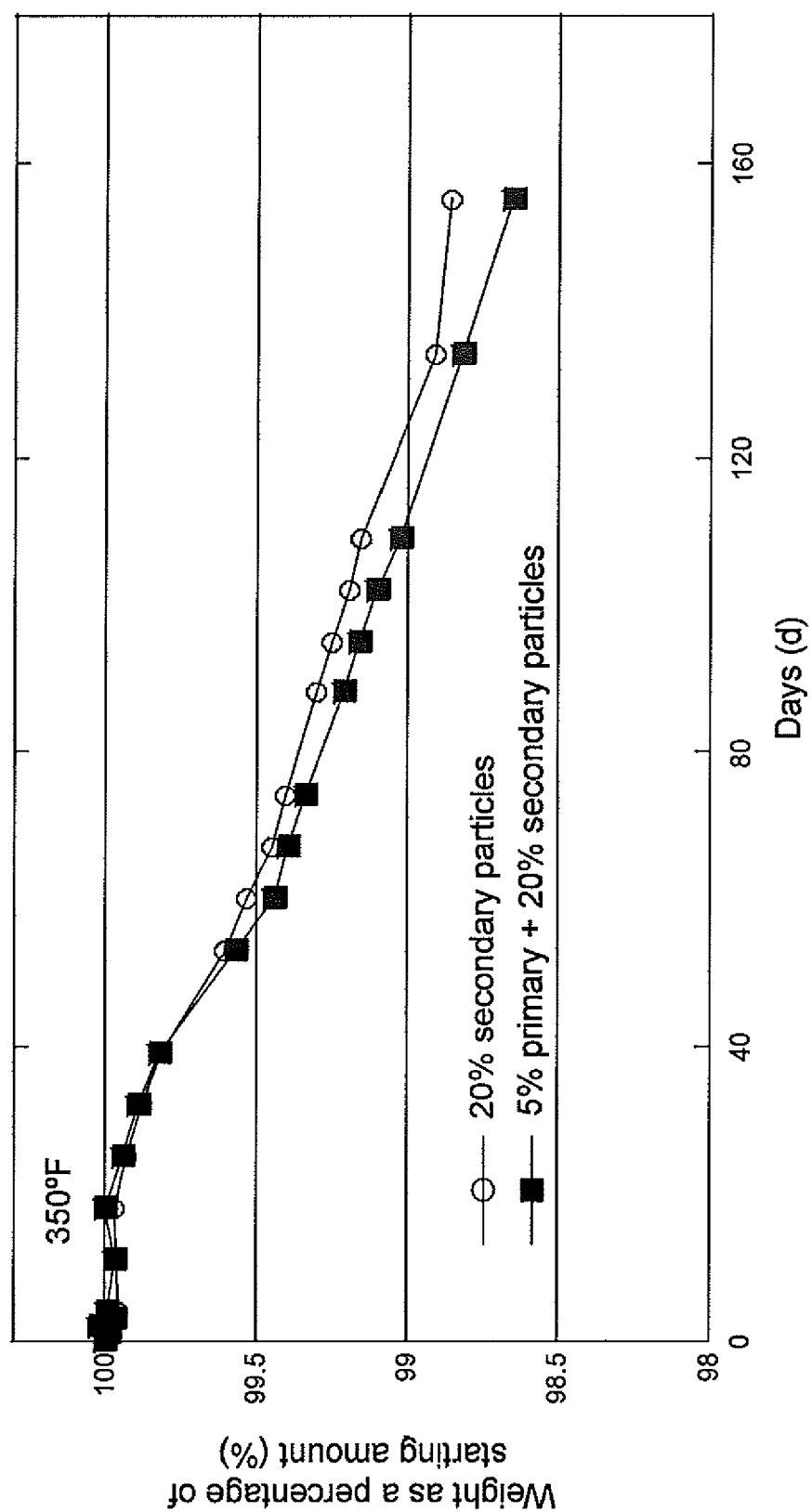

FIG. 14C illustrates the results for thermal stability testing up to about 150 days at 325° F. Each of the compositions demonstrated weight reductions starting approximately at the beginning of the test and the amount of weight loss increased with exposure time. Up to about 40 to 45 days, the weight loss exhibited by the two compositions was nearly identical. For exposure times greater than about 40 to 45 days, the composite comprising only secondary P84 toughening particles, trial 3, exhibited less weight reduction than the composite of trial 11 which comprised primary CSR toughening particles and secondary P84 toughening particles. Even with these weight losses, each of the compositions is found to lose less than about 1.5% of its original weight after about 150 hours.

(f) Summary of Composite Testing Results

BMI composites having different compositions of primary CSR toughening particles and secondary polyimide toughening particles were examined to investigate the role of each on the thermal and mechanical properties of the composites. These investigations demonstrate that presence of the secondary particles in the interlayer do not substantially influence the toughness of the composite but significantly improve the CAI strength of the composite. The addition of the primary CSR particles to the fiber region of the composite to the composition, absent the micron-scale particles, are also found to improve the toughness of the composite, while maintaining the CAI strength.

It is further observed that, when both the primary and secondary toughening particles are present in the composites, the location of these particles influences the mechanical properties of the composite. Notably, when the primary CSR toughening particles are located within the fiber region of the composite, the toughness of the composite is found to increase with increasing CSR concentration, while CAI strength remains about constant. However, while toughness improvements are still obtained with increasing CSR concentration when the primary CSR toughening particles are located in both the fiber and interlayer regions of the composite, the CAI strength decreases significantly.

Without being bound by theory, the reduction in CAI strength may be attributed to interference, by the primary CSR toughening particles, with one or more interactions which take place between the secondary P84 particles and the base polymer formulation within the interlayer region. Such interactions may include wetting of the secondary P84 toughening particles by the base polymer formulation and/or absorption of a portion of the base polymer formulation by the secondary P84 toughening particles.

Although the foregoing description has shown, described, and pointed out the fundamental novel features of the present teachings, it will be understood that various omissions, substitutions, changes, and/or additions in the form of the detail of the apparatus as illustrated, as well as the uses thereof, may be made by those skilled in the art, without departing from the scope of the present teachings. Consequently, the scope of the present teachings should not be limited to the foregoing discussion, but should be defined by the appended claims.

What is claimed is:

1. A prepreg, comprising:
   a first region, comprising:
      a plurality of fibers;
      and a first polymer composition comprising:
         a first bismaleimide polymer surrounding at least a portion of the fibers; and
         a first plurality of particles positioned within the first polymer; and
   a second region in contact with the first region, comprising:
      a second bismaleimide polymer composition, comprising
         a second polymer; and
         a second plurality of polyimide particles positioned within the second polymer;
   wherein the first plurality of particles are not substantially positioned within the second region.

2. The prepreg of claim 1, wherein at least one of the first and second bismaleimide polymer comprises an aliphatic bismaleimide.

3. The prepreg of claim 2, wherein the aliphatic bismaleimide is present in a concentration ranging between about 5 to 10 wt. % on the basis of the weight of the first or second polymer composition.

4. The prepreg of claim 1, wherein the diameter of the first plurality of particles is less than about the mean separation distance between the fibers.

5. The prepreg of claim 1, wherein the diameter of the first plurality of particles is less than about 1 μm.

6. The prepreg of claim 1, wherein the elastic modulus of the first plurality of particles is less than the elastic modulus of the first polymer when cured.

7. The prepreg of claim 1, wherein the first plurality of particles comprises core shell rubbers.

8. The prepreg of claim 1, wherein the concentration of the first plurality of particles ranges between about 2 to 7% on the basis of weight of the first polymer composition.

9. The prepreg of claim 1, wherein the second plurality of particles are located substantially only within the second region of the prepreg.

10. The prepreg of claim 1, wherein the second plurality of particles comprise a thermoplastic material having a glass transition temperature greater than about 200° C.

11. The prepreg of claim 1, wherein the concentration of the second plurality of particles ranges between about 15 to 25% on the basis of weight of the second polymer composition.

12. The prepreg of claim 1, wherein the diameter of the second plurality of particles ranges between about 1 to 75 μm.

13. The prepreg of claim 1, wherein the elastic modulus of the second plurality of particles is less than the elastic modulus of the second polymer material when cured.

* * * * *

UNITED STATES PATENT AND TRADEMARK OFFICE
CERTIFICATE OF CORRECTION

| | |
|---|---|
| PATENT NO. | : 8,080,313 B2 |
| APPLICATION NO. | : 12/787180 |
| DATED | : December 20, 2011 |
| INVENTOR(S) | : Mark Richard Bonneau et al. |

It is certified that error appears in the above-identified patent and that said Letters Patent is hereby corrected as shown below:

Column 18, line 54 (claim 13, line 3) "second polymer material" should read --second polymer--.

Signed and Sealed this
Twenty-eighth Day of February, 2012

David J. Kappos
*Director of the United States Patent and Trademark Office*